United States Patent
Choe et al.

(10) Patent No.: US 8,691,456 B2
(45) Date of Patent: Apr. 8, 2014

(54) AIR AND COOLANT CIRCUIT CONFIGURATIONS AND CONTROL OF FUEL CELL SYSTEMS AS POWER SOURCE IN AUTOMOTIVE, STATIONARY, AND PORTABLE APPLICATIONS

(75) Inventors: Song-Yul Choe, Alburn, AL (US);
Jong-Woo Ahn, Auburn, AL (US);
Soonil Jeon, Yongin-Si (KR); Daejong Kim, Yongin-Si (KR); Seoho Choi, Seoul (KR)

(73) Assignees: Hyundai Motor Company, Seoul (KR); Auburn University, Auburn, AL (US)

( * ) Notice: Subject to any disclaimer, the term of this patent is extended or adjusted under 35 U.S.C. 154(b) by 1159 days.

(21) Appl. No.: 12/218,111

(22) Filed: Jul. 10, 2008

(65) Prior Publication Data
US 2009/0126902 A1 May 21, 2009

Related U.S. Application Data

(60) Provisional application No. 60/958,889, filed on Jul. 10, 2007.

(51) Int. Cl.
*H01M 8/04* (2006.01)

(52) U.S. Cl.
CPC ...... *H01M 8/04768* (2013.01); *H01M 8/04723* (2013.01); *H01M 8/04753* (2013.01); *H01M 8/04365* (2013.01)
USPC .......................................... 429/428; 429/443

(58) Field of Classification Search
CPC ................. H01M 8/04723; H01M 8/04328; H01M 8/04335; H01M 8/043358; H01M 8/0438; H01M 8/04388; H01M 8/04395; H01M 8/04417; H01M 8/04771; H01M 8/04701; H01M 8/04708; H01M 8/04416; H01M 8/04746; H01M 8/04753
USPC ....................................................... 165/104.33
See application file for complete search history.

(56) References Cited

U.S. PATENT DOCUMENTS 6,186,254 B1 * 2/2001 Mufford et al. ................ 429/442
6,651,761 B1 11/2003 Hrovat et al. ................ 180/65.3
(Continued)

OTHER PUBLICATIONS

Alfonso Di Domenico et al., "Multi-Variable Control for an Automotive Traction PEM Fuel Cell System", Jun. 14-16, 2006, pp. 478-483, Proceedings of the 2006 American Control Conference, Minneapolis, Minnesota, USA.
(Continued)

*Primary Examiner* — Ula C Ruddock
*Assistant Examiner* — Scott J Chmielecki
(74) *Attorney, Agent, or Firm* — Haverstock & Owens LLP

(57) ABSTRACT

An air and coolant control system comprising: a heat source configured to receive air, generate heat, receive coolant, conduct the received coolant to a coolant outlet, and transfer the generated heat to the received coolant, thereby removing the generated heat from the heat source as the coolant is conducted out of the heat source; an air supply source configured to supply the air to the heat source; an air supply control system configured to adjust the supply of air from the air supply source to the heat source based on a dynamic feedback temperature characteristic from the heat source; a coolant supply source configured to supply the coolant to the heat source; and a coolant control system configured to adjust the flow rate of the coolant based on an estimated feed-forward heat source characteristic and to adjust the temperature of the coolant based on the dynamic feedback temperature characteristic.

33 Claims, 16 Drawing Sheets

(56) References Cited

U.S. PATENT DOCUMENTS

| | | | |
|---|---|---|---|
| 7,117,968 B2 | 10/2006 | Ono et al. | 180/220 |
| 2004/0005487 A1* | 1/2004 | Matoba | 429/22 |
| 2004/0033395 A1 | 2/2004 | Thompson | 429/13 |

OTHER PUBLICATIONS

Paul Rodatz et al., "Optimizing Air Supply Control of a PEM Fuel Cell System", Jun. 4-6, 2003, pp. 2043-2048, IEE Proceedings of the American Control Conference.

Ardalan Vahidi et al., "Model Predictive Control for Starvation Prevention in a Hybrid Fuel Cell System", Jun. 2004, pp. 834-839, Proceedings of the 2004 American Control Conference Boston, Massachusetts.

Meena Sundaresan "A Thermal Model to Evalute Sub-Freezing Startup for a Direct Hydrogen Hybrid Fuel Cell Vehicle Polymer Electrolyte Fuel Cell Stack and System", Mar. 2004, pp. 1-104, Institute of Transportation Studies University of California, Davis.

T.E. Springer et al., "Polymer Electrolyte Fuel Cell Model", Aug. 1991, pp. 2334-2342, The Electrochemical Society, Inc., vol. 138, No. 8.

B.D.O Anderson et al., "Optimal Control:Linear Quadratic Methods", Jan. 1989, pp. 20-26, Prentice-Hall, NJ, USA.

M Grujicic et al., "Control of the Transient Behaviour of Polymer Electrolyte Membrane Fuel Cell Systems", Jan. 2004, pp. 1239-1250, Proc. Instn. Mech. Engrs vol. 218 Part D: J. Automobile Engineering.

Woong-chul Yang et al., "Control Challenges and Methodologies in Fuel Cell Vehicle Development", Oct. 19-21, 1998, pp. 1-8, SAE Technical Paper Series 98C054.

Jay T. Pukrushpan et al., "Simulation and Analysis of Transient Fuel Cell System Performance Based on a Dynamic Reactant Flow Model", Nov. 17-22, 2002, pp. 1-12, Proceedings of IMECE '02, 2002 ASME International Mechanical Engineering Congress & Exposition, New Orleans, Louisiana.

Galip H. Guvelioglu et al., "Computational Fluid Dynamics Modeling of Polymer Electrolyte Membrane Fuel Cells", Mar. 2005, pp. 95-106, Journal of Power Sources 147, www.sciencedirect.com.

Sukkee Urn et al., "Computational Fluid Dynamics Modeling of Proton Exchange Membrane Fuel Cells", Aug. 2000, pp. 4485-4493, Journal of the Electromechanical Society, 147.

L. Ma et al, "Review of the Computational Fluid Dynamics Modeling of Fuel Cells", Nov. 2005, pp. 246-257 Journal of Nuel Cell Science and Technology, vol. 2, http:/www.asme.org/terms/Terrns_Use.cfm.

Yuyao Shan et al., A High Dynamic PEM Fuel Cell Model With Temperature Effects, Mar. 2005, pp. 30-39, Journal of Powers Sources 145, www.sciencedirect.com.

Krause P.C. et al., "Electromechanical Motion Devices",First ed.,Jan. 1989, pp. 280-285, McGraw-Hill Book Company, New York.

M. Ceraolo et al., "Modeling Static and Dynamic Behavior of Proton Exchange Membrane Fuel Cells on the Basis of Electro-Chemical Description", Sep. 2002, pp. 131-144, Journal of Power Sources, 113 , www.elsevier.com/locate/jppwsour.

Stephen Daniel Gurski, "Cold-Star Effects on Performance and Efficiency for Vehicle Fuel Cell Systems" Dec. 19, 2002, pp. 1-125, Thesis submitted to the Faculty of Virginia Polytechnic Institute and State University in partial fulfillment of the requirements for the degree of Master of Science in Mechanical Engineering.

M. Wohr et al., "Dynamic Modeling and Simulation of a Polymer Membrane Fuel Cell Including Mass Transport Limitation", Jan. 1997, pp. 213-218, International Association for Hydrogen Energy vol. 3.

J.C. Amphlett et al., "Performance Modeling of The Ballard Mark IV Solid Polymer Electrolyte Fuel Cell", Jan. 1995, pp. 1-8, The Electromechanical Society, vol. 142, No. 1.

Sylvain Gelfi et al., "Dynamic of Low-Pressure and High Pressure Fuel Cell Air Supply System",Proceedings of American Control Conference, Denver Colorado, 1998.

Richard T. Meyer et al., "Modeling and Simulation of a Modern PEM Fuel Cell System", Jun. 19-21, 2006 pagesl 1-18, The $4^{th}$ Conference on Fuel Cell Science, Engineering and Technology, Fuel Cell2006-97067.

"Turbomix High Efficiency Compact Air Blowers", Phoenix Analysis & Design Technologies, htts://padtinc.com/sales/fuelcell/turbomix/, Mar. 2007.

D.G. Kroger, "Radiator Characterization and Optimization", Jan. I984,pp. 1-7, Society of Automotive Engineers, Inc. 840380.

M Grujicic et al., "Model-Based Control Strategies in the Dynamic Interaction of Air Supply and Fuel Cell", May 14, 2004, pp. 487-499, Proc. Instn Mech. Engrs. vol. 218, Part A: J. Power and Energy.

* cited by examiner

| Fuel Cell | | | Electrochemical Reaction Model | | |
|---|---|---|---|---|---|
| n | 381 | | $P_0$ | 1.0 | bar |
| $A_{fc}$ | 0.028 | $m^2$ | $T_{ref}$ | 353.15 | K |
| Proton Conducting Model | | | $E_{ref}$ | 1.229 | V |
| $b_{11}$ | 0.5139 | | $A_{catl,eff}/A_{cell}$ | $f(I,T,P_{o2})$ | |
| $b_{12}$ | 0.326 | | Thermal model | | |
| $b_2$ | 350 | | | | |
| $n_d$ | $f(C_{water})$ | | $H_{gas}$ | $f(P, T)$ | |
| $D_w$ | $f(T, C_{water})$ | | $Cp_{gas}$ | $f(P, T)$ | |
| Gas Transport Model | | | $\rho_{gas}$ | $f(P, T)$ | |
| | | | $Fr_{area}$ | 2 | $m^2$ |
| Deff | $f(P, T)$ | $m^2 s^{-1}$ [4] | $m_{res}$ | 5 | kg |
| Psat | $f(T)$ | [4] | $hA_{pl}$ | 16.66 | $J K^{-1}$ |
| Geometrical data for layers | | | | | |
| | Thickness m | Density W $m^{-1}K^{-1}$ | Heat conductivity J $kg^{-1}K^{-1}$ | Specific heat kg $m^{-3}$ | |
| Coolant Channel | 0.001 | 1400 | 30 | 935 | |
| Plate | 0.001 | 1400 | 52 | 935 | |
| Gas Channel | 0.001 | 1400 | 52 | 935 | |
| GDL | 0.0004 | 2000 | 65 | 840 | |
| Catalyst layer | 0.000065 | 387 | 0.2 | 770 | |
| Membrane layer | 0.000183 | 1967 | 0.21 | 1100 | |

Fig. 7

AIR AND COOLANT CIRCUIT CONFIGURATIONS AND CONTROL OF FUEL CELL SYSTEMS AS POWER SOURCE IN AUTOMOTIVE, STATIONARY, AND PORTABLE APPLICATIONS

CROSS-REFERENCE TO RELATED APPLICATIONS

The present application claims priority to co-pending U.S. Provisional Application Ser. No. 60/958,889, filed Jul. 10, 2007, entitled "AIR AND COOLANT CONTROL OF FUEL CELL SYSTEMS IN AUTOMOTIVE APPLICATIONS," which is hereby incorporated by reference as if set forth herein.

FIELD OF THE INVENTION

The present invention relates to the field of fuel cell systems. More specifically, the present invention relates to a system for and method of controlling air and coolant properties of fuel cell systems. While the present invention is particularly well suited for automotive applications, it is also suitable for other applications as well. Furthermore, while the present invention is particularly well suited for fuel cell systems, it is also suitable for other power sources that produce heat as well.

BACKGROUND OF THE INVENTION

Air flow rate and temperature control of a PEM (Polymer Electrolyte Membrane) fuel cell stack are crucial issues for performance and durability of the stack. Insufficient supply of oxygen at an abrupt current change can cause oxygen starvation in the catalysts and cannot fully generate the power required. Improper rejection of the heat produced can cause hotspots in the layers or thermally stress the layers, which reduces the lifespan of the stack. Thus, the reactants and temperature in the cells should be managed by keeping operating limits of the stack and the performance as optimal as possible.

Temperatures continuously change as the load current varies. Temperature directly affects chemical reactions and water transport, as well as thermal stress on materials. Increasing the performance and durability of the power system is a crucial issue. Conversely, elevated temperatures can ease removal of water produced in the catalysts and increase mobility of water vapor in the membrane, which alleviates over-potentials. In addition, saving the parasitic power necessary for operating the electrical coolant pump can ensure the efficiency of the power system. Therefore, the development of a temperature control strategy is of primary interest to resolve the concerns of reliable operations and, at the same time, to increase performance.

The following nomenclature (alphabets, superscripts, subscripts, Greek symbols, etc.) are used throughout this disclosure:

| | | |
|---|---|---|
| A | Area | $m^2$ |
| C | Mass Concentration | $kg\ m^{-3}$ |
| Cp | Specific Heat | $W\ m^{-2}\ °C.^{-1}$ |
| F | Faraday Number | |
| Fr | Radiator Frontal Area | $m^2$ |
| i | Current Density | $A\ m^{-2}$ |
| J | Rotational Inertia | $kg\ m^2$ |
| m | Mass | kg |
| M | Molar Mass | $kg\ mol^{-1}$ |
| N | Mole Flux | $mol\ s^{-1}\ m^{-3}$ |
| n | Number | |
| p | (Partial) Pressure | Pa |
| Q | Heat Transfer | J |
| R | Universal Gas Constant | |
| R | Resistance | Ω |
| s | Entropy | $J\ mol^{-1}\ K^{-1}$ |
| t | Thickness | m |
| T | Temperature | K |
| W | Mass Flux | kg |
| amb | Ambient | |
| an | Anode | |
| bl | Blower | |
| c | Coolant | |
| ca | Cathode | |
| catl | Catalyst Layer | |
| cond | Conduction | |
| conv | Convection | |
| cv | Control Volume | |
| diff | Diffusion | |
| elec | Electro | |
| g | Gas | |
| i | Motor | |
| membr | Membrane Layer | |
| pl | Plumbing | |
| rad | Radiator | |
| res | Reservoir | |
| s | Stator | |
| sou | Source | |
| st | Stack | |
| ε | Porosity | |
| τ | Tortuosity, Torque | |
| λ | Water Content, Ratio | |
| ρ | Density | $kg\ m^{-3}$ |
| ω | Angular Velocity | $rad\ s^{-1}$ |
| η | Efficiency | |
| φ | Flux Linkage | $V\ s\ rad^{-1}$ |

The PEM fuel cell is a chemical device that generates electrical power and ejects heat and water (e.g., oxygen and hydrogen) as byproducts of the chemical reaction. Thus, the fuel cell is regarded as being free of air pollution, allowing the PEM fuel cell to be considered as a potential and alternative energy source in future automotive and stationary applications.

To replace the conventional power sources, the fuel cell systems must be analyzed and evaluated for performance, efficiency and reliability. The properties of PEM fuel cells are interrelated with factors including transport of reactants and byproducts, management of heat generated by electrochemical reaction or by current passing through the cell, and control of humidity to maintain adequate electrolyte conductivity.

The balance-of-plant (BOP) is a group of system components that supply reactants, remove generated heat, manage produced water, and control actuators. Typical components needed for operating a PEM fuel cell system, such as the prior art PEM fuel cell system 100 in FIG. 1, are a hydrogen tank 110 to store fuel and an air compressor or blower 120, each with corresponding inlet/outlet manifolds 115, 125, 185, 195. The hydrogen tank 110 and the blower 120 are fluidly coupled to a PEM fuel cell 140. The system 100 also comprises a humidifier 130 to supply humidified oxygen, a bypass valve 150, a radiator with a fan 160, a fluid reservoir 170, a coolant pump 180, and several control valves 113, 123, 187, 197 and controllers to properly manage the heat generated.

Controlling of a fuel cell power system requires a better understanding of the dynamic behavior of the stack that interacts with different BOP components. Due to the complexity of the system, dynamic models are utilized to efficiently design and effectively assess controllers. The models for the PEM fuel cell stack, air supply and thermal system are briefly described below.

Most fuel cell models, which describe physical behaviors of a PEM fuel cell, are based on either empirical equations fitted to the curve of a specific polarization characteristic or the CFD (Computational Fluid Dynamics) to solve the mass and charges transport. The former has been proposed for designing a controller for the air supply system. The dynamics lacking in a cell are improved by reflecting the charging and discharging behavior of the double layer present on the interface between electrodes and electrolytes. However, the model does not fully include the dynamics of gas and temperature occurring through the flow paths and in the cell when the current is applied. In addition, the partial pressure drops along the pores in the GDL (Gas Diffusion Layer) that affects the net pressure exerted on the chemical reaction rate and increase the over-potential are not considered. The temperature rise that eases water removal, increases the chemical reaction and subsequently affects the output voltage of a cell has not been taken into account.

On the other hand, the CFD based models have been widely employed to analyze transport mechanisms of the mass and charge and their spatial distributions for a single cell, but limited to represent the dynamic characteristic of a stack in conjunction with components of the BOP and a power system. In addition, exponential growth of computational time required for unsteady analyses impedes application of the model for the stack.

The model used in this disclosure is based on empirical equations and takes into account three additional major effects—water balance in the membrane, gas dynamics in the gas diffusion layer, and temperature distribution in a cell described below.

A cell is constructed by the connection of individual models for layers. The I-V characteristic is obtained through the difference between the open circuit voltage and the over-potentials that include the ohmic over-potential in the membrane, the activation over-potential in the catalyst on the cathode side, and the concentration over-potential. The relationship for a single cell may be written as the function of physical parameters, such as the reactant partial pressure, temperature, and current and membrane water content. The output characteristic of the stack is assumed by the product of the cell number with one of a single cell.

$$V_{cell} = E(p,T) - v_{act}(p,T,i) - v_{ohmic}(i, \lambda_{membr}, T) - v_{conc}(p,T,i)$$

$$V_{st} = n \cdot V_{cell}$$

The dynamics of a fuel cell system involve mass flow of air and water. The air supplied flows through the gas flow channel and the GDL before reaching the catalysts, and at the same time, takes up water from the humidifier. Water generated in the catalysts diffuses through the membrane where protons take up water from the anode to the cathode side. The heat generated by chemical reaction and charge transport elevates temperature in the cell. All of these changes affect the dynamic behavior of the cell. Further improvements of the dynamics have been made by considering the following three effects: 1) Water dynamics in the membrane, 2) Partial pressure drop in the GDL, and 3) Temperature variation.

Water content in the membrane determines proton conductivity. The dynamics of water content are described by two effects: the electro-osmotic driving force by the different electrochemical potentials at the anode and cathode, and the diffusion caused by the water concentration gradient at the two boundaries. Considering the water mass that flows at the boundaries of the membrane layer, the dynamic of the water concentration in the membrane can be improved as follows, where C is the mass concentration (kg·m$^{-3}$), M is the mole mass (kg·mole$^{-1}$), b is the parameter (given in the reference Krause P. C. and Wasynczuk. (1989) O, *Electrochemical Motion Devices*, first ed., McGraw-Hill Book Company, New York), $\rho$ is the membrane dry density, and $A_{cell}$ is the fuel cell area (m$^2$).

$$\lambda_{membr} = \frac{C_{H_2O,mass}/M_{H_2O}}{\frac{\rho_{dry,member}}{M_{membr}} - b \cdot C_{H_2O,mass}/M_{H_2O}}$$

$$m_{water,membr} = \frac{d(C_{H_2O,mass}A_{cell}l_{membr})}{dt} =$$

$$W_{ele,member,an} - W_{ele,membr,ca} + W_{diff,membr,an} + W_{diff,membr,ca}$$

The reactant entering the cell diffuses through the GDL before reaching the catalyst layer and significantly affects the overall dynamics of the reactants. This diffusion effect is reflected by using the mass continuity and the Stefan-Maxwell equations:

$$\frac{\varepsilon_g}{RT}\frac{\partial p_i}{\partial t} + \frac{\partial N_i}{\partial y} = 0$$

$$\frac{\varepsilon_g}{\tau^2}\frac{\partial p_i}{\partial y} = \sum_{k=1}^{3} \frac{RT}{p_{ca}D_{ik}}(p_i N_k - p_k N_i)$$

Hence, i, k $\in (1,3)$ sums up the species partial pressures where $p_1$ is the oxygen partial pressure, $p_2 = p_{sat}(T)$ and $p_3$ are the water vapor and the nitrogen partial pressure, respectively, and the diffusion coefficients of $p_{ca}D_{ik}$ include the cathode pressure of $p_{ca}$. The parameters $\tau$ and $\epsilon_g$ are constants describing the pore curvature of the GDL.

If a cell is assembled with cubical layers, in which the thermo-physical properties are isotropic and constant, then according to the energy conservation equation, the total energy changes in a controlled volume are equal to the sum of energy exchange at boundaries and internal energy resources. In fact, the energy exchanges at boundaries occur by two factors: a) the conduction across the cell; and b) the convection occurring between bipolar plates with the coolant, reactants and water. The thermal-dynamic behavior can thus be described with the following energy conservation equation:

$$\sum_i Cp_i C_{i,mass} A_{cell} l_{cv} \frac{dT_{cv}}{dt} = \underbrace{\sum W_{in} A_{cell} C_{p_j}(T_{in} - T_{cv})}_{\text{mass-flow-in}} +$$

$$\underbrace{Q_{conv} A_{cell}}_{\text{convection-heat-transfer}} + \underbrace{Q_{cond} A_{cell}}_{\text{conduction-heat-transfer}} + \underbrace{Q_{sou}}_{\text{sources}}$$

The internal energy source is composed of the entropy loss and the chemical energy required for protons to overcome the barrier of the over-potentials in both catalyst layers. In addition, others are ohmic losses caused by a transport of electrons and protons in the cell:

$$Q_{sou} = I \cdot \left(-\frac{T\Delta s}{4F} + v_{act} + I \cdot R_{membr}\right),$$

where $\Delta s$ is equal to $-65.0$ (J·mol$^{-1}$K$^{-1}$), $v_{act}$ (given in the reference Amphlett, J. C., Baumert, R. M., Mann, R. F., Peppley, B. A. and Roberge, P. R., (1995) Performance modeling of the Ballard Mark IV solid polymer electrolyte fuel cell, J. Elecrochem. Soc., 142 1 9-15), and $R_{membr}$ is the membrane resistance.

The air supply system should continuously replenish the air to the fuel cell stack as the load varies. It consists of four subsystems: an air supplier, a humidifier, and an inlet and outlet manifold with a regulator adjusting the pressure at the stack.

Due to the efficiency of the system, a blower is widely employed for supplying air. The humidifier in the study is simplified as an ideal one without any associated dynamics and energy losses.

The blower is usually driven by an electric motor. The dynamic characteristic of the blower system is described by a sum of all moments of inertia of the motor and the impeller, and the torque produced by the motor. Hence, the torque produced by the motor, $\tau_{bl,m}$ (J), is a function of the stator resistance, $R_{s,bl,m}$ (Ohm), flux linkage, $\Phi_{bl,m}$ (V·s·rad$^{-1}$), and the number of the poles, $n_{bl,m,pl}$, with the stator voltage, $V_{bl,m}$ (V).

$$\frac{d\omega_{bl}}{dt} = \frac{1}{J_{bl}}\left(\tau_{bl,m} - \frac{W_{bl}\Delta P_{bl}\eta_{bl,m}}{\eta_{bl}\rho_{amb}\omega_{bl}}\right)$$

$$\tau_{bl,m} = \eta_{bl,m}\frac{3}{2}\left(\frac{\eta_{bl,m,pl}}{2}\right)\left(\frac{\Phi_{bl,m}}{R_{s,bl,m}}\right)\left[v_{bl,m} - \left(\frac{N_{bl,m,pl}}{2}\right)\Phi_{bl,m}\omega_{bl}\right]$$

where $\omega$ is angular velocity (rad·s$^{-1}$), J is rotational inertia (kg·m$^2$), $\eta$ is efficiency, p is pressure (Pa), and $\rho$ is air density (kg·m$^{-3}$). The flow rate of the air blower is given as a function of the angular velocity and pressure and the efficiency as a function of the flow rate and the angular velocity:

$$W_{bl} = \begin{cases} \omega_{bl} \cdot (-20.581 \cdot (p^*)^2 - 1.4415 \cdot 10^{-3} \cdot p^* + 4.1333 \cdot 10^{-5}), \\ \quad p^* \leq 9 \cdot 10^{-4} \text{Pa} \cdot s^2/\text{rad}^2 \\ \text{otherwise, } \omega_{bl} \cdot (-1.7973 \cdot p^* + 1.6409 \cdot 10^{-3}) \end{cases}$$

$$\eta_{bl} = -2.8831 \cdot 10^{13} \cdot \left(\frac{W_{bl}}{\omega_{bl}}\right)^3 + 9.5115 \cdot 10^8 \cdot \left(\frac{W_{bl}}{\omega_{bl}}\right)^2 + 1.3087 \cdot 10^4 \cdot \left(\frac{W_{bl}}{\omega_{bl}}\right) + 0.17945$$

where $p^*$ is $\left(\frac{p_{ca} - p_{amb}}{\omega_{bl}^2}\right)$.

The parameters of the blower are extracted by characteristic data and specifications delivered by PADT (Phoenix Analysis & Design Technologies), which include both the flow parameter and overall efficiency versus the head parameter.

Dynamic characteristics of the inlet and outlet manifold pressures are described by using the mass conservation equation.

$$\frac{dp_{im}}{dt} = \frac{\gamma R_a}{V_{im}}(W_{bl}T_{bl} - W_{im,out}T_{im})$$

$$\frac{dp_{om}}{dt} = \frac{R_a T_{om}}{V_{om}}(W_{ca,out} - W_{om,out})$$

A thermal circuit should be capable of rejecting excessive heat produced by the stack. The circuit consists of a three-way valve to allow the coolant to bypass or to flow into a radiator to exchange heat with the ambient media, a fan to increase effectiveness of the heat convection, and a reservoir to store and thermally insulate the coolants. Finally, a coolant pump serves to supply the coolant for the heat source.

The opening of the bypass valve is assumed to be linear with a factor k, the coolant temperature at the reservoir inlet is expressed as a function of k, the coolant temperature at the stack outlet, $T_{st,c,out}$, and the radiator outlet, $T_{rad,c,out}$.

$$W_c \cdot Cp_c \cdot T_{res,c,in} = (1-k) \cdot W_c \cdot Cp_c \cdot T_{st,c,out} + k \cdot W_c \cdot Cp_c \cdot T_{rad,c,out}$$

The behavior of the radiator is described by the principle of thermodynamics. Kroger, D. G., (1984) *Radiator Characterization and Optimization*, SAE paper 840380 proposed an empirical equation for a heat transfer coefficient of the radiator, $h_{rad}$ (kW·m$^{-2\circ}$C.$^{-1}$) and pressure drop $p_r$ (kPa) of the radiator as a function of the air flow rate, $W_{air}$ (kg·s$^{-1}$).

$$h_{rad} = -1.4495 \cdot W_{air}^2 + 5.9045 \cdot W_{air} - 0.1157$$

$$p_r = (326.12 \cdot W_{air} - 75.396) + 101.325$$

If the heat of the coolant is fully transferred to the radiator without any losses, the heat capacity of the coolant is identical with that of the radiator. Thus, the radiator outlet coolant temperature can be expressed as a function of the radiator geometry and the heat convection caused by the temperature difference between the ambient and the radiator outgoing air temperature:

$$T_{rad,c,out} = T_{rad,c,in} - 0.5 \cdot \left(\frac{Fr_{area} \cdot (T_{rad,c,in} - T_{amb}) \cdot h_{rad}}{W_c Cp_c}\right).$$

Hence, $Fr_{area}$ denotes the frontal area (m$^2$) of the radiator and $T_{rad,c,in}$ denotes the radiator inlet coolant temperature. The electric power for the fan can be calculated according to a thermal dynamic relationship between pressure drop and air flow rate, $$P_{fan} = \frac{1}{\eta_{elec}\eta_{fan}}\left(W_{air}Cp_{air}T_{amb}P_r^{\left(\frac{k-1}{k}-1\right)}\right),$$

where $P_{fan}$ denotes the electric power (W) of the fan.

The reservoir should be thermally insulated after a heat exchanger at the radiator by convection. The variation of the heat in the reservoir is the sum of the heat that the coolant carries and the heat being exchanged with the ambient. Therefore, the reservoir outlet coolant temperature at the end of the given time interval, $T_{res,c,out}$ (° K) can be expressed by the equation $$T_{res,c,out} = T_{res,p} - \frac{\Delta t}{mCp_{res}}(W_c Cp_c \cdot (T_{res,p} - T_{res,c,in}) + hA_{pl} \cdot (T_{res,c,in} - T_{amb})),$$

where $T_{res,p}$ is the temperature of the reservoir at the previous of tie step (K), $\Delta t$ is the time interval (sec), $M_{res}$ is equivalent to the mass of the coolant in the reservoir (kg), $T_{res,c,in}$ is the reservoir inlet coolant temperature (K), and $h \cdot A_{pl}$ is the heat transfer of plumbing to the ambient (J·K$^{-1}$), respectively.

Suppose that all of the heat generated in the stack is completely transferred to the coolant. The coolant flow rate is then expressed by the relationship with the heat source.

$$W_c = \frac{Q_{sou}}{Cp_c \Delta T}$$

At an equilibrium state, the excessive heat rejected by the coolants is identical to the sum of the heat the reservoir stores and the radiator exchanges with the ambient. Firstly, a maximum coolant flow rate is assumed, and then the temperature drop along the coolant flow channel can be calculated by taking into account the fact that the maximum heat produced in the stack should be rejected by the coolant flow rate. The temperature at the outlet of the coolant is assumed to be 72° C. because the temperature gradient from the catalyst to the coolants channel amounts to 8° K at a maximum load current if the catalyst temperature is 80° C. Thus, the inlet temperature is obtained at a temperature drop of 12° C. and the maximum flow rate of 3 kg/sec. The heat transfer coefficient of the radiator and the volume of the reservoir are chosen based on the maximum heat capacity stored and rejected.

FIG. 2 shows a block diagram for a typical control system 200 that includes two controls for the air and coolant flow rate. System 200 comprises a hydrogen tank 210 fluidly coupled to a fuel cell stack 240 through a valve 235, such as a pressure relief valve. The hydrogen tank 210 provides hydrogen $W_{H2}$ to the fuel cell stack 240.

A blower 220 is fluidly coupled to the fuel stack 240 to provide air $W_{bl}$ to the fuel cell stack 240 (in some embodiments, through an inlet manifold 225). A portion of the air pressure $P_{im}$ can be diverted from the inlet manifold 225 through a stator 230 to the valve 235. The rate of air supply is controlled by an air supply control system 215. Air supply control system 215 uses a reference load current $I_{ref}$ and interpolates map data using a function $f(I_{st})$ in controller 217 to determine and provide a voltage $V_{bl}$ to the blower 220, thereby controlling the air supply to the fuel cell stack 240.

A coolant pump 280 fluidly couples a reservoir 270 to the fuel cell stack 240 in order to supply coolant $W_c$ from the reservoir 270 to the fuel cell stack 240. A radiator and fan 260 fluidly couples outlets on the fuel cell stack 240 to the reservoir 270 in order to cool coolant $W_{c,an}$ and $W_{c,ca}$ from the anode and cathode side of the fuel cell stack 240 and provide the cooled coolant to the reservoir 270 for later use. The flow rate of the coolant to the fuel cell stack 240 is controlled by a coolant flow control system 250. Coolant flow control system 250 compares a reference coolant temperature $T_{c,ref}$ with an average coolant temperature $T_{c,ave}$ from the stack, using a logic component 255. This comparison is used by a proportional-integral (PI) controller 257 in order to determine and provide a control signal to the coolant pump 280, thereby controlling the coolant supply to the fuel cell stack 240. The average coolant temperature $T_{c,ave}$ is obtained using temperature sensors disposed downstream from the fuel cell stack 240 and upstream from the coolant flow control system 250. The sensors transmit the temperatures ($T_{c,an}$ and $T_{c,ca}$) of the coolant from the anode side of the fuel cell stack and the cathode side of the fuel cell stack to logic components 245 and 253, where the temperatures are added and halved in order to form $T_{c,ave}$.

Additional output, such as water, is directed away from the fuel cell stack 240 and system 200 via an outlet manifold 285, valve 287 and stator 290.

The objectives for the air flow rate control are to maintain the optimal oxygen excess ratio and, subsequently, to prevent an oxygen starvation that may occur during abrupt changes of the current load. Hence, the oxygen excess ratio is defined as a ratio of the oxygen supplied to the oxygen consumed, where the oxygen consumed depends on the stack current. The oxygen supplied to the stack is directly proportional to the air flow rate delivered by the air blower and finally the amplitude of the blow motor voltage. Thus, a controller for the air flow rate, a static feed-forward controller (sFF), is designed by using a polynomial that interpolates a map data. The data includes an optimal relationship between the stack current required and the motor voltage of the blower in order to maintain the oxygen excess ratio at 2, which is intensively handled by other authors (Domenico, A. D., Miotti, A., Alhetairshi, M., Guezennec, Y. G., Rajagopalan, S. S. V. and Yurkovich, S., (2006) *Multi-variable control for an automotive traction PEM fuel cell system*, Proc. The 2006 American Control Conference, Minneapolis, Minn.; Rodatz, P., Paganelli, G. and Guzella, L., (2003) *Optimization air supply control of a PEM Fuel Cell system*, IEEE Proc. American Control conference; Vahidi, A., Stefanopoulou, A. G. and Peng, H., (2004) *Model Predictive Control for Starvation Prevention in a Hybrid Fuel Cell system*, IEEE Proc. American Control conference). As shown in FIG. 7, the performance of the controls is excellent, particularly at the rejection behavior of the oxygen excess ratio at a disturbance. However, the model used for the design of the controls assumed that the working temperature of the stack is constant, which does not correspond to the real behavior of the stack in operation.

SUMMARY OF THE INVENTION

The present invention provides new control strategies for a thermal circuit that reduce a temperature surge in the catalysts at a dynamic load change, minimize the parasitic power, and optimize oxygen starvations in the air supply system. The model for the single cell considers geometry of the gas diffusion layers, influences of the temperature variation, and, subsequently, water content on the proton conductivity in the membrane. In some embodiments, the thermal circuit comprises a bypass valve, a radiator with a fan, a reservoir, and a coolant pump. In some embodiments, the air supply system comprises a blower and inlet and outlet manifolds. Based on the component models, controls for the air and coolant flows are designed and compared under aspects of the oxygen excess ratio and the temperature surge in catalysts, as well as parasitic power. Particularly, the coolant flow rate is controlled so that the excess heat in the cells at a load profile is estimated and fed-forward to the coolant control loop that compensates this surplus heat. Classic PI controllers and a state feedback control for the thermal circuit have been designed. The heat source term dependent upon the load current is fed-forward to the closed loop and the temperature effects on the air flow rate are compensated.

The dynamics and performance of the designed controllers are evaluated and analyzed by simulations using dynamic fuel cell system models at a multi-step current and a current profile measured by the FUDS (Federal Urban Driving System) mode. The results show that the control strategies of the present invention can alleviate a temperature rise in the catalyst layer and the oxygen starvation, as well as address the parasitic power needed for operation of the air and coolant pumps.

The control for the coolant flow is based on the energy equation. In fact, the stack composed of cells can be regulated as a thermal mass with a thermal capacity. If the heat exchange by radiation is negligible and the stack temperature is equal to the average of the stack outlet coolants temperature on the anode and cathode sides, then the temperature change in the stack is equal to the sum of the heat source terms in the stack, the heat exchanged with the coolants and the ambient:

$$m_{st}Cp_{st}\frac{dT_{st}}{dt} = Q_{sou}W_c \cdot Cp_c \cdot (T_{c,in} - T_{st}) - hA \cdot (T_{amb} - T_{st}),$$

where $m_{st}Cp_{st}$ is the heat capacity of the stack (J·K$^{-1}$), $W_c$ is the coolant flow rate (kg·s$^{-1}$) as the control variable, and $Q_{sou}$ is the internal energy source (J·s$^{-1}$) that is a function of the load current. Due to the nonlinearity of the equations in the lumped thermal stack above and the reservoir model, the Taylor expansion is used to obtain a linear equation at an operating point, where the coolant temperature and flow rate are 64° C. and 0.93 kg/sec. The stack current and voltage are 140 A and 198 V, respectively. The state equations and variables are defined as follows:

$$\delta \dot{x} = A \cdot \delta x + B_u \cdot u + B_w \cdot w$$
$$\delta y = C \cdot \delta x$$

$x = [T_{st}\ T_{res}]$ (States)
$u = [W_c\ k]$ (Controlled Input)
$w = I_{st}$ (Disturbance)
$y = [T_{st}\ T_{res}]$ (Output)

$$A = \begin{bmatrix} -0.0245 & 0.0245 \\ 0.0243 & -0.0487 \end{bmatrix}, B_u = \begin{bmatrix} -0.3179 & 0 \\ 0.0089 & -1.1482 \end{bmatrix},$$

$$B_w = \begin{bmatrix} 0.634 \times 10^{-5} \\ 0 \end{bmatrix}, C = \begin{bmatrix} 1 & 0 \\ 0 & 1 \end{bmatrix}.$$

The linearized equation (16) is transformed on the Laplace domain:

$$(m_{st}Cp_{st} \cdot s + Cp_cW_c^0 + hA) \cdot T_{st}(s) = Q_{sou}(s) - Cp_cT_c^0 \cdot W_c(s) + W_c^0 Cp_w T_c^0 + hAT_{amb}.$$

Hence, the superscript ° indicates the constant values at the operating point.

In fact, the first term represents the source term, while the third and fourth terms show constants. The transfer function between the stack temperature and coolant flow rate results in the first order of the differential equation used for a design of a classic PI controller:

$$\frac{T_{st}(s)}{W_c(s)} = \frac{Cp_c T_c^0}{(m_{st}Cp_{st} \cdot s + Cp_c W_c^0 + hA)}$$

$$G_c(s) = K_p + \frac{K_I}{s}.$$

Hence, the heat source term $Q_{sou}$ is regarded as a disturbance for the thermal system, which should be suppressed as quickly as possible. Thus, the two gains of the PI controller are selected by the 3 times higher bandwidth of the closed-loop than the one of the thermal system and a damping ratio of 0.707. The resulting gains are $K_p$=0.2734 and $K_I$=0.0443 (sec$^{-1}$).

When a current drawn from the stack varies abruptly, the heat generated in the stack tends to follow it with a time constant. The typical coolant controls, however, cannot fully reject this heat, simply because of the sensing points of the temperature at the outlet of the coolants. Subsequently, the heat rejected becomes less than the heat generated.

As a countermeasure, the present invention estimates the temperature rise in a stack directly caused by the current load and feed-forwards this information to the temperature control loop. The relationship between the current and the stack temperature yields the following transfer function, where $R_{act}$ represents the equivalent resistance for the activation overpotential:

$$\frac{T_{st}(s)}{I(s)} = \frac{\left(-\frac{T\Delta s}{4F} + R_{act} + R_{membr}\right)}{(m_{st}Cp_{st} \cdot s + Cp_c W_c^0 + hA)}.$$

On the other hand, the temperature of the coolants control loop is set lower than the temperature in the stack for rejection of the heat in the stack, which changes the temperature in gas flow channels and, consequently, the pressure. When the temperature in the channel gets lower, the pressure drops according to the ideal gas law in the given volume and then a pressure difference to the inlet manifold gets larger. As a result, the mass flow rate at the inlet of the stack increases according to the Nozzle equation (Pukrushpan, J. T., Peng, H. and Stefanopoulou, A. G., (2002) *Simulation and Analysis of Transient Fuel Cell System Performance based on a Dynamic Reactant Flow Model*, Proc. Of IMEXE'01, 2002 ASME International Mechanical Engineering Congress & Exposition, New Orleans, La.) and, consequently, the oxygen excess ratio gets increased.

The increased air mass flow rate can be reduced by adding a compensator in the control strategy that compensates the flow rate according to the coolant's temperature increase and to the current that determines the consumed oxygen. Due to a nonlinear relationship between the blower voltage and different currents and temperatures at the optimum oxygen excess ratio, a set of data is obtained by multi-runs of the entire model under different currents and temperatures, which is then used for a compensation of the effects.

In one aspect of the present invention, an air and coolant control system is provided. The system comprises a heat source, an air supply source, an air supply control system, a coolant supply source, and a coolant control system.

In some embodiments, the heat source comprises an air inlet, a coolant inlet, and a coolant outlet fluidly coupled to the coolant inlet through the heat source. In some embodiments, the heat source is configured to receive air through the air inlet, to generate heat in response to receiving the air, to receive coolant through the coolant inlet, to conduct the received coolant to the coolant outlet, and to transfer a portion of the generated heat to the received coolant, thereby removing the portion of the generated heat from the heat source as the coolant is conducted out of the heat source through the coolant outlet. In some embodiments, the heat source is a fuel cell stack. For example, the heat source can be a Polymer Electrolyte Membrane (PEM) fuel cell stack. However, it is contemplated that the present invention applies to other heat sources as well.

The air supply source is fluidly coupled to the air inlet of the heat source and is configured to supply the air to the heat source. In some embodiments, the air supply control system is configured to adjust the flow rate of air from the air supply source to the heat source based on a dynamic feedback temperature characteristic from the heat source.

The coolant supply source is fluidly coupled to the coolant inlet of the heat source and is configured to supply the coolant to the heat source. In some embodiments, the coolant control system is configured to adjust the flow rate of the coolant supplied to the heat source based on an estimated feed-forward heat source characteristic. In some embodiments, the coolant control system is configured to adjust the temperature of the coolant supplied to the heat source based on the dynamic feedback temperature characteristic.

In some embodiments, the system includes a fuel source fluidly coupled to the heat source and configured to supply a fuel to the heat source. For example, in some embodiments, a hydrogen tank is fluidly coupled to the fuel cell stack in order to supply hydrogen to the fuel cell stack.

Although this disclosure describes particular configurations of dynamic feedback temperature data and estimated feed-forward heat source temperature data being used for certain control/adjustment mechanisms, it is contemplated that these control/adjustment mechanisms are capable of using both types of data, as well as other data not explicitly discussed. The dynamic feedback temperature data is any data that is provided via a feedback loop and that indicates some sort of updated temperature status of the heat source. For example, in some embodiments, the dynamic feedback temperature characteristic comprises information indicating a temperature of the coolant measured at the coolant outlet of the heat source. The estimated feed-forward heat source data is any data that is provided via a feed-forward line and that predicts heat source operation characteristics. For example, in some embodiments, the estimated feed-forward heat source characteristic comprises an estimation of excess heat in the heat source at a load profile. A feed-forward controller is able to adjust the flow rate of the coolant based on the load profile and interpolated map data.

In some embodiments, the coolant control system comprises at least one controller from the group of controllers consisting of: a proportional-integral controller and a state feedback controller.

It is contemplated that the coolant temperature is capable of being adjusted in a variety of ways. In some embodiments, the system includes a coolant reservoir configured to store coolant that is to be conducted to and through the heat source, a coolant pump configured to pump the coolant from the coolant reservoir to the heat source, the flow rate of the coolant being controlled by the coolant flow control system, a cooling system configured to cool coolant from the heat stack and provide the cooled coolant to the coolant reservoir, and a bypass valve configured to regulate the amount of coolant supplied from the heat source to the cooling system for cooling. In some embodiments, this regulation is based on dynamic temperature information about the heat source.

In another aspect of the present invention, a method of controlling a heat source system is provided. In some embodiments, the heat source system comprises a heat source, a load profile for the heat source, an air supply source, and a coolant supply source.

In some embodiments, the method comprises flowing air from the air supply source to the heat source at an air flow rate. In some embodiments, the air flow rate is adjusted based on a dynamic feedback temperature characteristic. The heat source generates heat in response to receiving the air from the air supply source. Coolant flows from the coolant supply source to and through the heat source at a coolant flow rate and a coolant temperature. In some embodiments, the coolant flow rate is adjusted based on a dynamic feedback temperature characteristic and the coolant temperature is adjusted based on a feed-forward heat source characteristic. The heat source transfers a portion of the generated heat to the coolant, thereby removing the portion of the generated heat from the heat source as the coolant flows out of the heat source.

All of the design variations discussed herein with respect to the systems of the present invention also apply to the methods as well.

It is contemplated that the present invention can employ any combination of the air flow rate, coolant flow rate, and coolant temperature adjustment mechanisms disclosed herein.

BRIEF DESCRIPTION OF THE DRAWINGS

FIG. 7 is a table showing parameters and reference data for chosen models.

FIG. 15($b$) is a graph illustrating the temperature of the catalysts and coolants without the feed-forward.

FIG. 15($c$) is a graph illustrating the temperature of the catalysts and coolants with the feed-forward.

FIG. 15(*d*) is a graph illustrating the oxygen excess ratio after a temperature compensation.

DETAILED DESCRIPTION OF THE INVENTION

Figure 1:
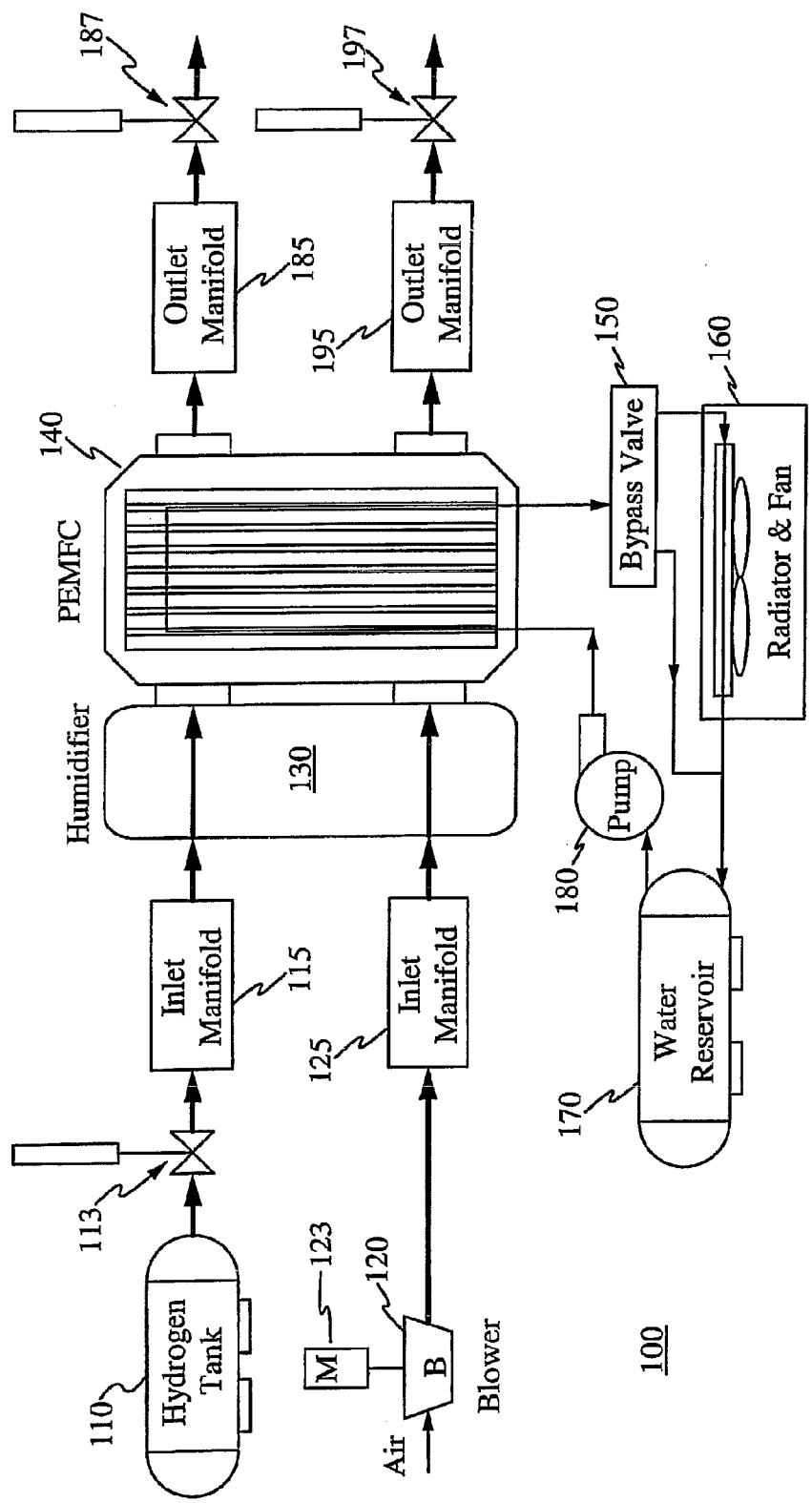
FIG. 1 illustrates a prior art PEM fuel cell system.

The following description is presented to enable one of ordinary skill in the art to make and use the invention and is provided in the context of a patent application and its requirements. Various modifications to the described embodiments will be readily apparent to those skilled in the art and the generic principles herein may be applied to other embodiments. Thus, the present invention is not intended to be limited to the embodiment shown but is to be accorded the widest scope consistent with the principles and features described herein.

This disclosure provides several embodiments of the present invention. It is contemplated that any features from any embodiment can be combined with any features from any other embodiment. In this fashion, hybrid configurations of the illustrated embodiments are well within the scope of the present invention.

The state equations derived above present a multi-input-multi-output structure, where two controlled input variables, coolant temperature and flow rate, are dependant on each other. This dependence can be minimized if the time constants of two feedback loops are set in a different order. Then, the temperature in the stack can be controlled by the coolant flow rate independent of the temperature of the coolant being controlled by the opening factor k. The equation $$m_{st} Cp_{st} \frac{dT_{st}}{dt} = Q_{sou} W_c \cdot Cp_c \cdot (T_{c,in} - T_{st}) - hA \cdot (T_{amb} - T_{st})$$

includes a relationship between the stack temperature and the coolant flow rate, whose transfer function is $$\frac{T_{st}(s)}{W_c(s)} = \frac{Cp_c \cdot (T_{res}^0 - T_{st}^0)}{(mCp_{st} \cdot s + W_c^0 \cdot Cp_c + hA_{st})}, \text{ and } G_{c1}(s) = K_{p,c} + \frac{K_{l,c}}{s}.$$

Equation $T_{res,c,out} =$ $$T_{res,p} - \frac{\Delta t}{mCp_{res}}(W_c Cp_c \cdot (T_{res,p} - T_{res,c,in}) + hA_{pl} \cdot (T_{res,in} - T_{amb}))$$

includes a relationship between the temperature in the reservoir and the factor for the bypass valve opening, which is the transfer function $$\frac{T_{res}(s)}{k(s)} = \frac{(W_c^0 \cdot Cp_c + hA_{pl}) \cdot (T_{amb} - T_{st}^0)}{(mCp_{res} \cdot s + W_c^0 \cdot Cp_c)},$$

and $G_{c2}(s) = K_{p,b} + \frac{K_{l,b}}{s}.$

Likewise, the gains for the PI controller are selected so that the bandwidth of the closed-loop is 5 times higher than the time constant of the coolant flow feedback outer loop. In addition, the damping ratio is set to be 0.707. The resulting gains are $K_{p,b}=0.1902$ and $K_{I,b}=0.0546$ (sec$^{-1}$).

The classic PI controller does not consider the parasitic power in the coolant pump as a control object, even though it sufficiently rejects the heat and effectively suppresses the temperature surges in the layers. One alternative is the use of a state feedback control, where the parasitic power dissipated in the coolant pump can be advantageously considered as one of the control objectives. On the other hand, the parasitic power of the coolant pump is directly proportional to the coolant flow rate. Thus, the coolant flow rate is included as a parameter in the cost function below. The optimization of the gains is conducted by the LQR (linear quadratic regulator) method, which basically sums the square of the errors.

$$J = \int_0^\infty (\delta x^T Q_x \delta x + \delta u^T R \delta u) dt.$$

$Q_x$ represents the weighting matrix amplifying the errors of the control objects, while the other weighting matrix R is used to suppress the effect of the manipulating variables.

The state equation of the control plant presents a 2-by-2 matrix, where the variables are coupled with each other. A decoupling of the two loops has been accomplished by assigning different time constants to the two closed loops. In fact, the valve opening factor does not directly affect the dynamics of the stack temperature, while the reservoir temperature is strongly influenced by the valve opening factor rather than the coolant flow rate. Hence, the time constant of the transfer function between the stack temperature and coolant flow rate is set 5 times faster than the one between the stack temperature and the valve opening factor.

On the other hand, integrators are required to suppress any steady state errors. Thus, the errors of both closed loops are defined as a new state variable that is considered in the cost function:

$$q = \begin{bmatrix} T_{st}^* - T_{st} \\ T_{res}^* - T_{res} \end{bmatrix}$$

$$J = \int_0^\infty (\delta x^T Q_x \delta x + q^T Q_1 q + \delta u^T R \delta u) dt$$

$Q_1$ is the weighting matrix for integrator. Then, the rules for the optimal control inputs are obtained:

$$\delta u = -K[\delta x q]^T = -K_p \cdot \delta x - K_1 \cdot q,$$

where the controller gain is $K = R^{-1} Bu'^T P$. P is the solution of the Algebraic Riccati Equation that is given as follows:

$$P \cdot A' + A' \cdot P + Q - P \cdot B'_u \cdot R^{-1} \cdot B'_u{}^T \cdot P = 0,$$

where $A', B'_u, Q = \text{diag}(Q_x, Q_I)$ and $$R = \begin{bmatrix} 100 & 0 \\ 0 & 1 \end{bmatrix}.$$

When the weighting matrix R is larger than the weighting matrix Q, the role of the coolant flow rate in the cost function increases, and subsequently, the gains of the controller are chosen, which minimizes the parasitic power. After several iterations with different weighting factors, the optimal control matrix $K_p$ and $K_I$ is given by $$K_p = \begin{bmatrix} -1.2015 & 0.01 \\ -0.0521 & -3.1479 \end{bmatrix}, K_I = \begin{bmatrix} -0.1 & 0.0027 \\ -0.0027 & -0.1 \end{bmatrix}.$$

The heat produced in the stack tends to follow the current drawn from the stack. The current-dependent heat is regarded as a disturbance in the control loop, which cannot be fully rejected by the typical coolant control that measures the temperature at the outlet of the coolants. As a result, the heat rejected gets less than the heat produced. A countermeasure is to estimate temperature rise in a layer that is directly related to the magnitude of the current load and feed-forward it to the temperature control loop shown in FIGS. 5A and 6A. The relationship between the current and the stack temperature yields the following transfer function, where $v_{act}$ represents the activation over-potential:

$$\frac{T_{st}(s)}{I(s)} = \frac{\left(-\frac{T\Delta s}{4F} + v_{act}\right)}{(m_{st}Cp_{st} \cdot s + Cp_c W_c^0 + hA)},$$

$$\frac{T_{st}(s)}{I^2(s)} = \frac{R_{membr}}{(m_{st}Cp_{st} \cdot s + Cp_c W_c^0 + hA)}.$$

However, all of the previously published air supply control designs assumed a constant working temperature of the cell. In fact, distribution of the temperature in the individual layers through the plane varies because of the various heat sources of irreversible energy occurring in the chemical reactions, and Joules losses associated with charges transport. In order for rejection of the heat in the stack to occur, the temperature of the coolant control loop is set lower than the one in the stack, thereby changing the temperature in the gas flow channels. When the temperature in the channel gets lower, the pressure drops according to the ideal gas law for the given volume, and then a pressure difference to the inlet manifold gets larger. On the other hand, the mass flow rate at the inlet of the stack increases according to the nozzle equation and, consequently, the oxygen excess ratio increases. The surplus air is reduced by an additional element in the controls that depends upon the coolant temperature in addition to the current that determines the consumed oxygen. Due to a nonlinear relationship between the blower voltage and different currents and temperatures at the optimum oxygen excess ratio, a set of data is obtained by multi-runs of the entire model under different currents and temperatures, used for a compensation of the effects.

Figure 3:
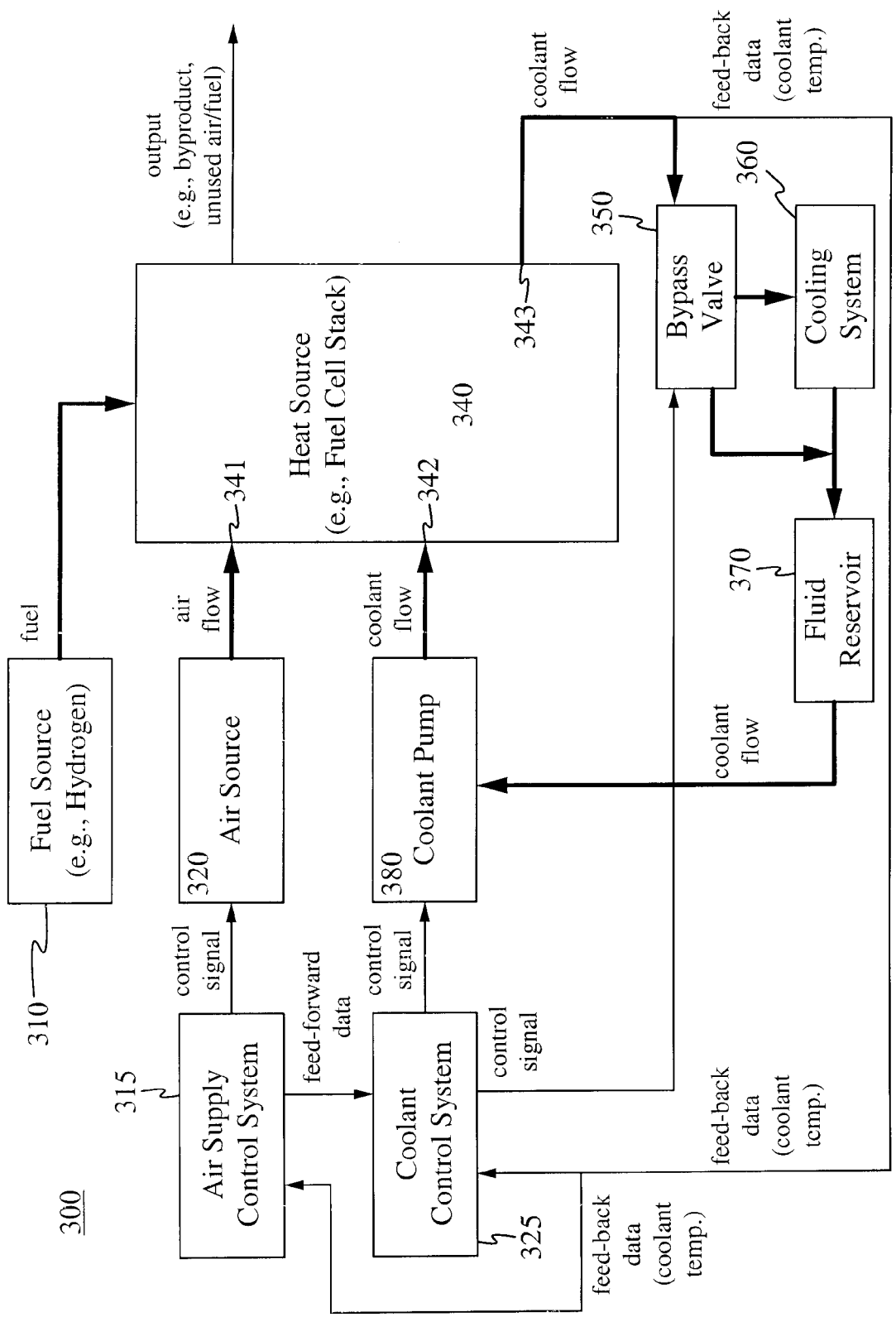
FIG. 3 illustrates a generalized embodiment of an air and coolant control system with feed-forward coolant control and temperature-compensated air supply in accordance with the principles of the present invention.

FIG. 3 illustrates a generalized embodiment of an air and coolant control system 300 with feed-forward coolant control and temperature-compensated air supply in accordance with the principles of the present invention. System 300 comprises a heat source 340, an air supply source 320, an air supply control system 315, a coolant supply source (comprising a coolant pump 380 and a fluid reservoir 370), and a coolant control system 325.

The heat source 340 comprises an air inlet 341 fluidly coupled to the air supply source 320, a coolant inlet 342 fluidly coupled to the coolant supply source, and a coolant outlet 343 fluidly coupled to the coolant inlet through the heat source 340. The heat source 340 is configured to receive air through the air inlet, to generate heat in response to receiving the air, to receive coolant through the coolant inlet, to conduct the received coolant to the coolant outlet, and to transfer a portion of the generated heat to the received coolant, thereby removing the portion of the generated heat from the heat source 340 as the coolant is conducted out of the heat source 340 through the coolant outlet. In some embodiments, the heat source 340 comprises a PEM fuel cell stack. However, in some embodiments, the heat source 340 comprises other types of fuel cell stacks, or other devices in addition to or as alternatives to a fuel cell stack.

The air supply source 320 is fluidly coupled to the air inlet of the heat source 340 and is configured to supply the air to the heat source 340. In some embodiments, the air supply source 320 is an air compressor or blower.

The air supply control system 315 is operationally coupled to the air supply source 320, such as through a hard-wire or wireless connection, and is configured to adjust the supply of air from the air supply source 320 to the heat source 340 based on a dynamic feedback temperature characteristic of the heat source. This dynamic feedback temperature characteristic indicates the temperature of one or more components of the heat source. In some embodiments, the dynamic feedback temperature characteristic comprises the temperature of the coolant from the heat source, which is ideally determined by one or more temperature sensors coupled to the coolant output of the heat source 340. This temperature information is determined by the sensors when the coolant comes into contact with them and is then transmitted to the air supply control system 315, where it is processed and used by a controller to determine an appropriate control signal for controlling the air supply source 320. Based on the temperature information about the heat source 340, the air supply control system 315 will adjust the amount of air being supplied to the heat source 340. Current controls for air flow rate do not consider the effects of the temperature of the heat stack components or the coolant on the air flow rate, which results in more parasitic power being dissipated. The compensation of the temperature on the air flow rate reduces the parasitic power. In addition to the feedback temperature information, the air supply control system is also able to base its control of the air source supply 320 on the load profile being applied to the system 300.

The coolant supply source is fluidly coupled to the coolant inlet of the heat source 340 and is configured to supply the coolant to the heat source 340. In some embodiments, the coolant supply source comprises a fluid reservoir 370 configured to store coolant and a coolant pump 380 configured to pump coolant from the coolant reservoir to the heat source. The flow rate of the coolant is controlled by the coolant control system 325. In some embodiments, cooling system 360, such as a radiator and fan, is provided in order to cool coolant from the heat source 340 and provide the cooled coolant to the coolant reservoir 370. In some embodiments, a bypass valve 350 is provided in order to regulate the amount of coolant supplied from the heat source 340 to the cooling system 360 versus the amount of coolant from the heat source 340 that bypasses the cooling system 360 on its way to the coolant reservoir 370. In some embodiments, this regulation is based on dynamic temperature information about the heat source 340.

The coolant control system 325 is configured to adjust at least one coolant characteristic of the control system 300. Examples of such coolant characteristics include the flow rate of the coolant supplied to the heat source 340, which is able to be controlled by controlling the coolant pump 380, and the temperature of the coolant supplied to the heat source 340, which is able to be controlled by controlling the amount of coolant from the heat source 340 that passes through or bypasses the cooling system 360 (such as by changing the angle of the bypass valve).

The adjustment of the coolant flow rate is based on an estimated feed-forward heat source characteristic. This estimated feed-forward heat source characteristic is a temperature profile that is based on the load profile being applied to the system 300. Algorithms are used to calculate the fictitious temperature profile and compensate it by a feed-forward control. In some embodiments, this load profile is the same load profile that is used by the air supply control system 315 in its control of the air supply source 320, and is capable of being forwarded from the air supply control system 315 to the coolant control system 325. Additionally or alternatively, it is provided independent of the air supply control system 315 (e.g., it does not have to be provided to the coolant control system 325 by the air supply control system 315).

The adjustment of the coolant temperature is based on the dynamic feedback temperature characteristic discussed above. In this respect, system 300 is able to use a similar sensor and communication configuration to transmit information about heat source temperature to the coolant flow control system 325. In some embodiments, this information is based on the actual temperature value measured at the outlet of the coolant channel of the heat source 340. Additionally or alternatively, it is based on other measurements or data as well.

Additional matter other than the coolant (such as by-products, air, fuel, etc.) is output via one or more output lines fluidly coupled to the heat source 340.

Figure 4:
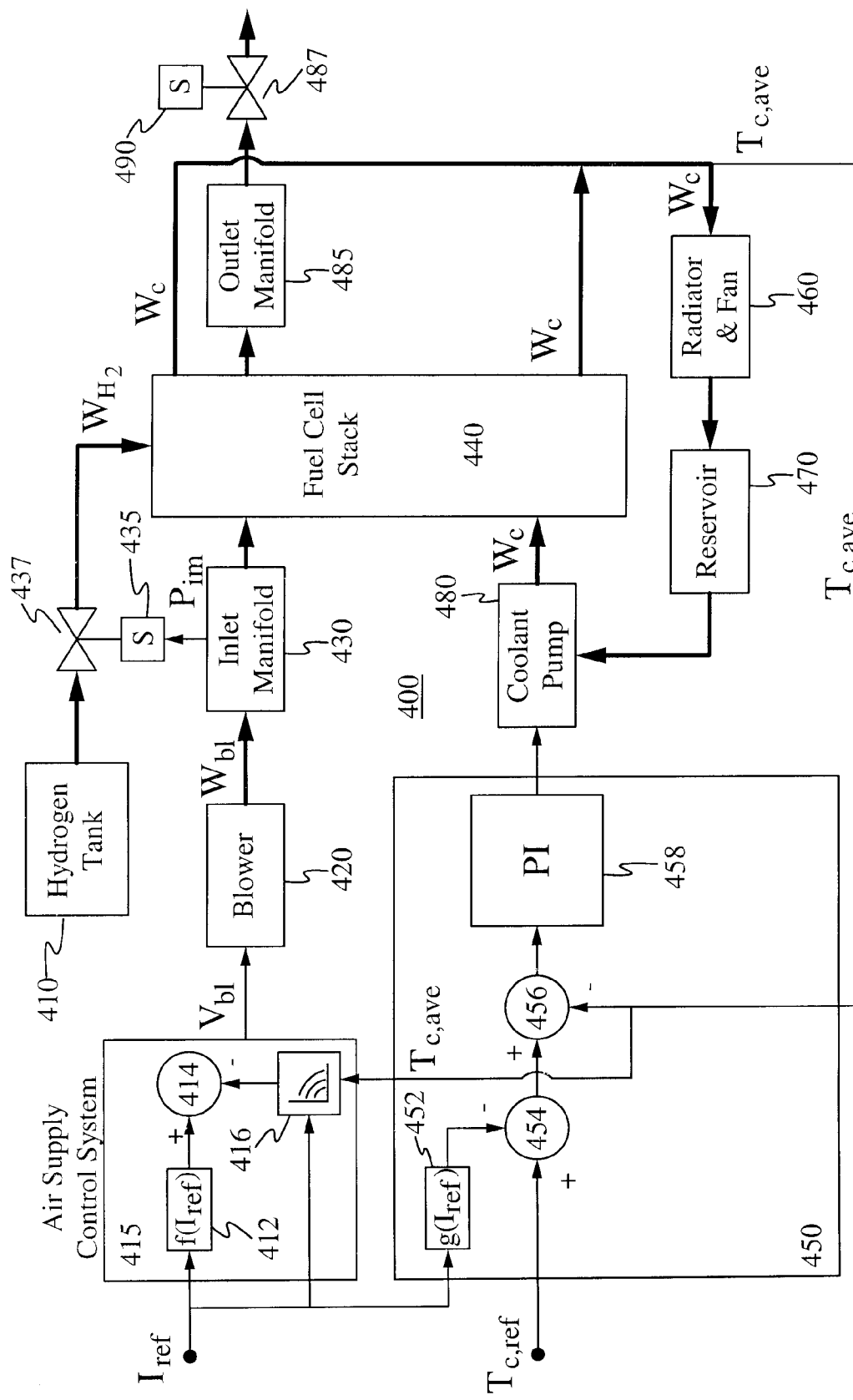
FIG. 4 illustrates a more specific embodiment of an air and coolant control system using a PI controller in accordance with the principles of the present invention.

FIG. 4 illustrates a more specific embodiment of an air and coolant control system 400 using a PI controller in accordance with the principles of the present invention. System 400 comprises a fuel cell stack 440, an air supply source 420 (such as a blower), an air supply control system 415, a coolant supply source (in some embodiments, comprising a coolant pump 480, a fluid reservoir 470, and a radiator and fan 460), and a coolant flow control system 450.

The fuel cell stack 440 comprises an air inlet fluidly coupled to the air supply source 420, a coolant inlet fluidly coupled to the coolant supply source, and a coolant outlet fluidly coupled to the coolant inlet through the fuel cell stack 440.

The air supply source 420 is fluidly coupled to the air inlet of the fuel cell stack 440 and is configured to supply the air to the fuel cell stack 440. The air supply control system 415 is operationally coupled to the air supply source 420, such as through a hard-wire or wireless connection, and is configured to adjust the supply of air from the air supply source 420 to the heat source 440 based on a dynamic feedback temperature characteristic from the fuel cell stack. This dynamic feedback temperature characteristic indicates the temperature of one or more components of the fuel cell stack (e.g., the catalyst). In some embodiments, the dynamic feedback temperature characteristic comprises the temperature of the coolant from the fuel cell stack, which is ideally determined by one or more temperature sensors coupled to the coolant output of the fuel cell stack 440. This temperature information is determined by the sensors when the coolant comes into contact with them and is then transmitted to the air supply control system 415, where it is processed and used by a controller to determine an appropriate control signal for controlling the air supply source 420. Based on the temperature information ($T_{c,ave}$) about the fuel cell stack 440, the air supply control system 415 will adjust the amount of air being supplied to the fuel cell stack 440. In some embodiments, this temperature information is transmitted to a compensator 416 in the air supply control system 415. The compensator 416 uses this temperature information, along with other information, such as a reference current $I_{ref}$, to compensate for dynamic conditions of the fuel cell stack 440. Air supply control system 415 uses the reference load current $I_{ref}$ and interpolates map data using a function $f(I_{ref})$ in controller 412. In some embodiments, a logic component 414 is used to process results from controller 412 and compensator 416.

The coolant supply source is fluidly coupled to the coolant inlet of the fuel cell stack 440 and is configured to supply the coolant to the fuel cell stack 440. In some embodiments, the coolant supply source comprises a coolant reservoir 470 configured to store coolant and a coolant pump 480 configured to pump coolant from the coolant reservoir 470 to the fuel cell stack 440. The flow rate of the coolant is controlled by the coolant flow control system 450. In some embodiments, a cooling system 460, such as a radiator and fan, is provided in order to cool the coolant from the fuel cell stack and provide the cooled coolant to the coolant reservoir 470.

The coolant flow control system 440 is configured to adjust the flow rate of the coolant supplied to the fuel cell stack 440, which is controlled by controlling the coolant pump 480. The adjustment of the coolant flow rate is based on the estimated feed-forward heat source characteristic discussed above. This estimated feed-forward heat source characteristic is a temperature profile that is based on the load profile being applied to the system 400. Algorithms are used to calculate the fictitious temperature profile and compensate it by a feed-forward control. In some embodiments, this load profile is the same load profile that is used by the air supply control system 415 in its control of the air supply source 420, and is therefore able to be forwarded from the air supply control system 415 to the coolant flow control system 450. In some embodiments, air supply control system 450 uses the reference load current $I_{ref}$ and interpolate map data using a function $g(I_{ref})$ in controller 452. In some embodiments, logic component 454 is used to process results from controller 452 and a coolant reference temperature $T_{c,ref}$. Logic component 454 transmits its results to logic component 456, which incorporates the dynamic feedback temperature characteristic from the fuel cell stack 440 before transmitting its results to PI controller 458. PI controller 458 controls the operation of the coolant pump 480, thereby regulating the flow rate of the coolant into the fuel cell stack.

Figure 2:
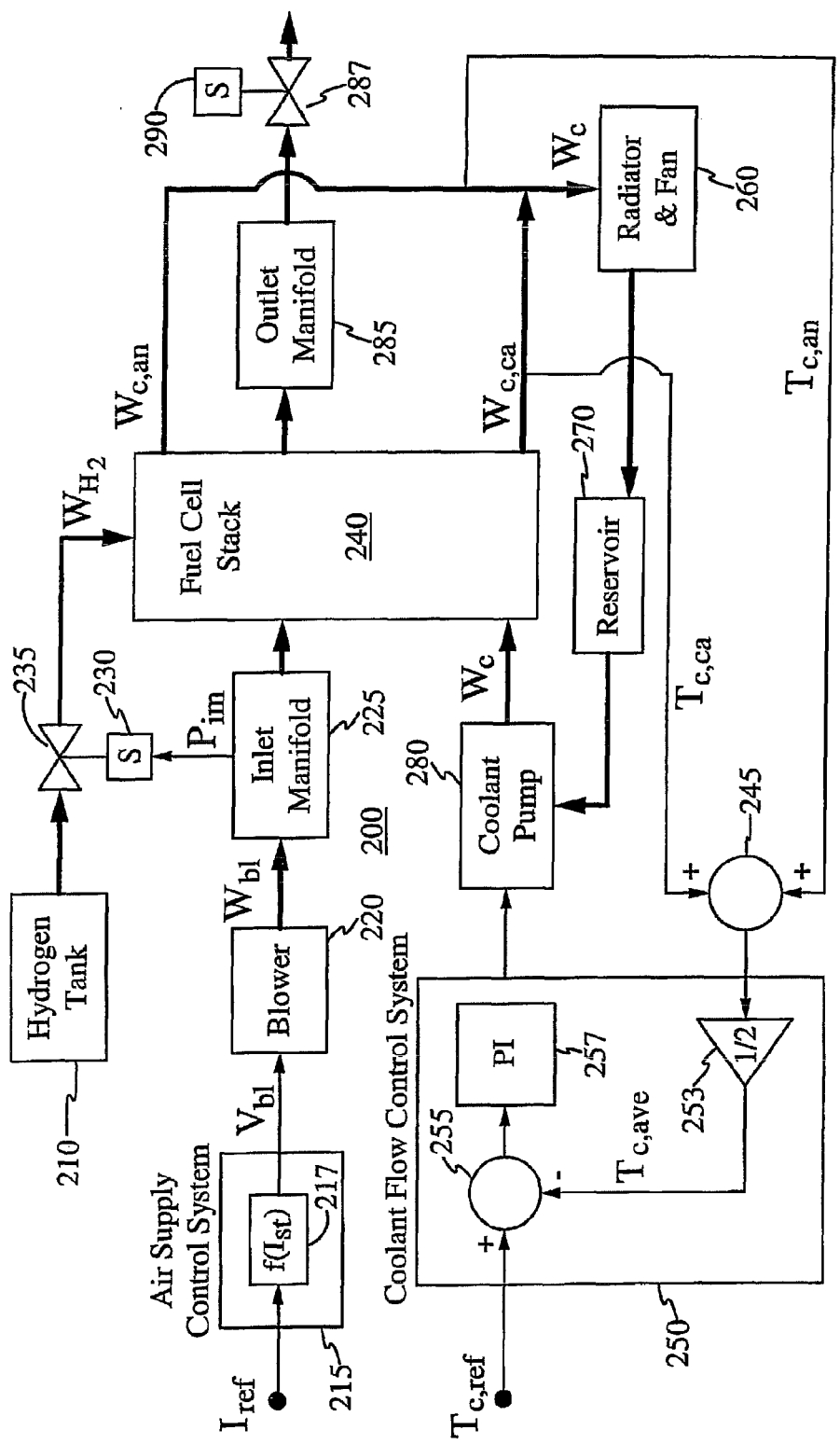
FIG. 2 illustrates a prior art air and coolant control system.

In some embodiments, system 400 comprises a hydrogen tank 410, inlet manifold 430, outlet manifold 485, stators 435 and 490, and valves 437 and 487, similar to the configuration of the corresponding components presented in FIG. 2.

Figure 5A:
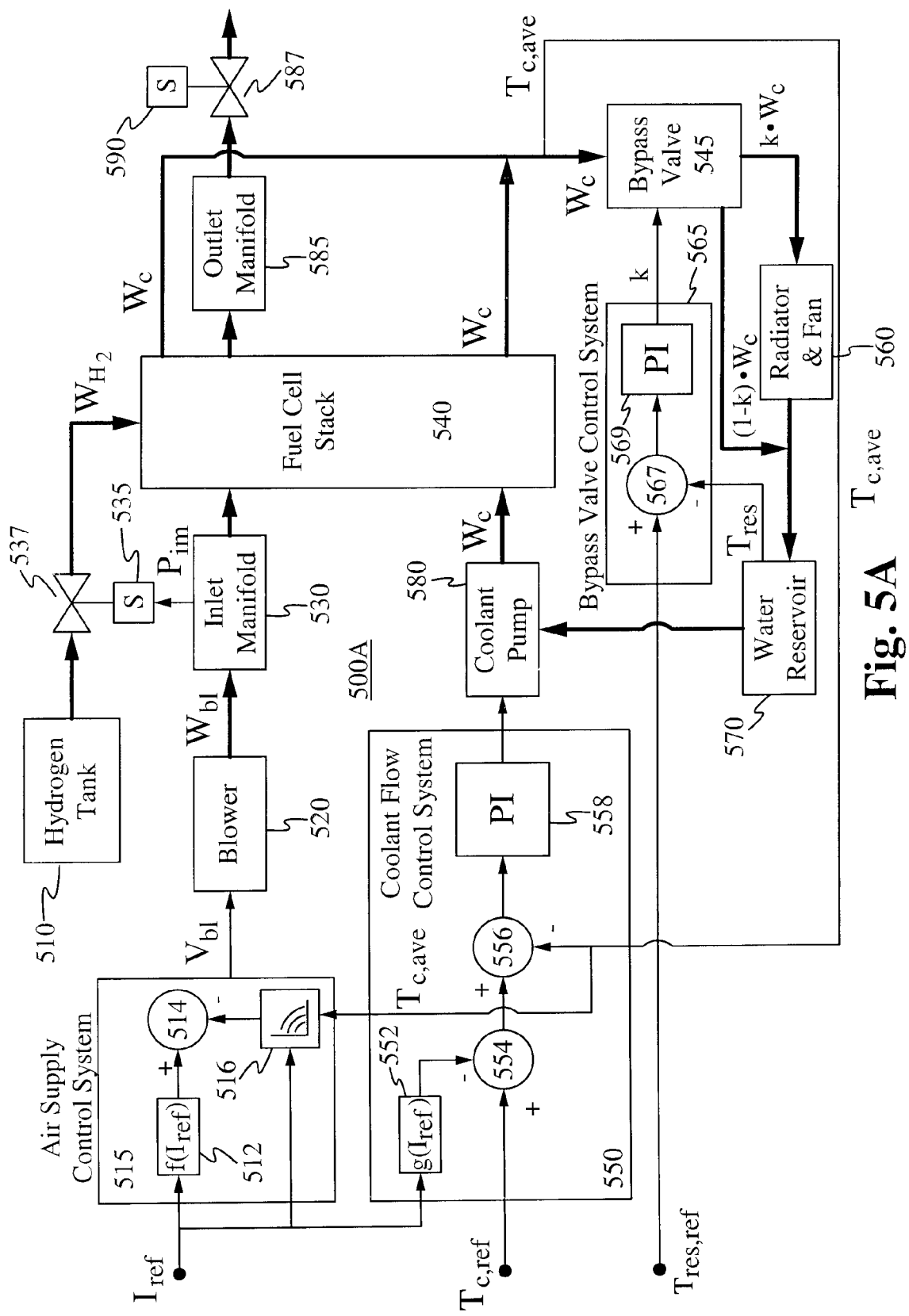
FIG. 5A illustrates another embodiment of an air and coolant control system using a PI controller and a bypass valve in accordance with the principles of the present invention.

FIG. 5A illustrates another embodiment of an air and coolant control system 500A using a PI controller and a bypass valve in accordance with the principles of the present invention. In some embodiments, system 500A comprises a hydrogen tank 510, air supply source 520, air supply control system 515, controller 512, logic component 514, comparator 516, coolant flow control system 550, controller 552, logic components 554 and 556, PI controller 558, coolant pump 580, coolant reservoir 570, radiator and fan 560, fuel cell stack 540, inlet manifold 530, outlet manifold 585, stators 535 and 590, and valves 537 and 587, similar to the configuration of the corresponding components presented in FIG. 4, with similar connections and functionality.

However, system 500A additionally comprises a bypass valve 545 fluidly coupled between the fuel cell stack 540 and the radiator and fan 560, as well as a bypass valve control system 565 operationally coupled to the bypass valve 545. The bypass valve 545 is configured to regulate the amount of coolant supplied from the fuel cell stack 540 to the radiator and fan 560 versus the amount of coolant from the fuel cell stack 540 that bypasses radiator and fan 560 on its way to the coolant reservoir 570. In some embodiments, this regulation is based on dynamic temperature information about the fuel cell stack 540.

The bypass valve control system 565 is configured to control the amount of coolant from the fuel cell stack 540 that passes through or bypasses the radiator and fan 560. As mentioned above, the bypass valve control system 565 is able to regulate the bypass valve 545 based on dynamic temperature information about the fuel cell stack 540. For example, temperature sensors are able to determine the temperature of the coolant stored in the coolant reservoir 570. This temperature information $T_{res}$ is then transmitted to the bypass valve control system 565, where it is compared with a reference reservoir temperature $T_{res,ref}$ by a logic component 567 in order to determine the degree of temperature variation in the fuel cell stack 540. The result is transmitted to a PI controller 569, which determines the appropriate proportion k of coolant that should be cooled (i.e., passed through the radiator and fan 560) before reaching the coolant reservoir 570. The remaining portion (1−k) of coolant bypasses the cooling system 560. The PI controller 569 is able to transmit a control signal to the bypass valve 545 to regulate the valve accordingly.

Figure 5B:
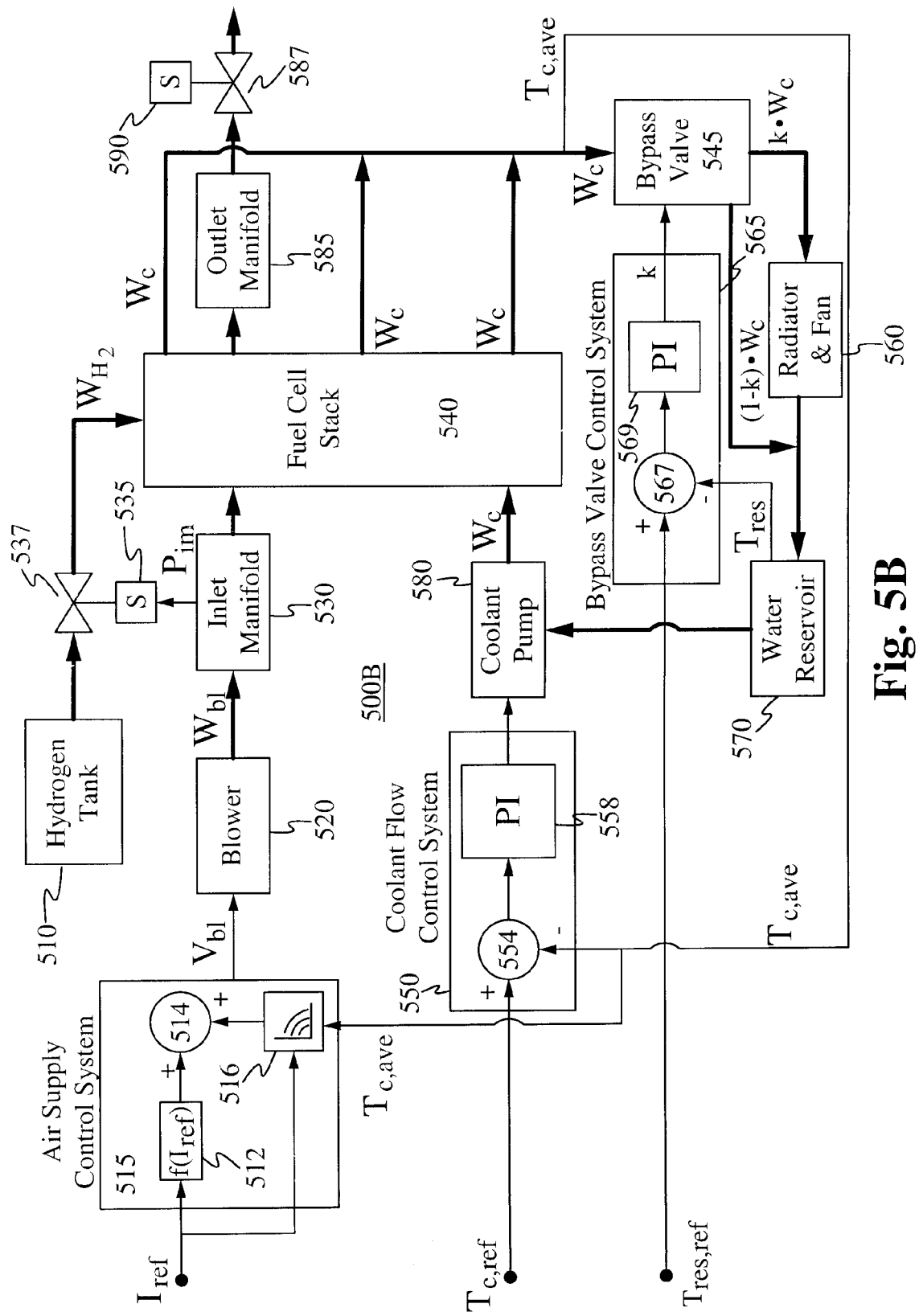
FIG. 5B illustrates yet another embodiment of an air and coolant control system using a PI controller and a bypass valve in accordance with the principles of the present invention.

FIG. 5B illustrates yet another embodiment of an air and coolant control system 500B, which is a variation of system 500A in FIG. 5A. System 500B has the same components and functionality as FIG. 5A, except that the coolant flow control system 550 does not incorporate a feed-forward heat source characteristic. Rather, it uses the dynamic feedback temperature characteristic to determine the appropriate coolant flow rate without applying an estimated load profile.

Figure 6A:
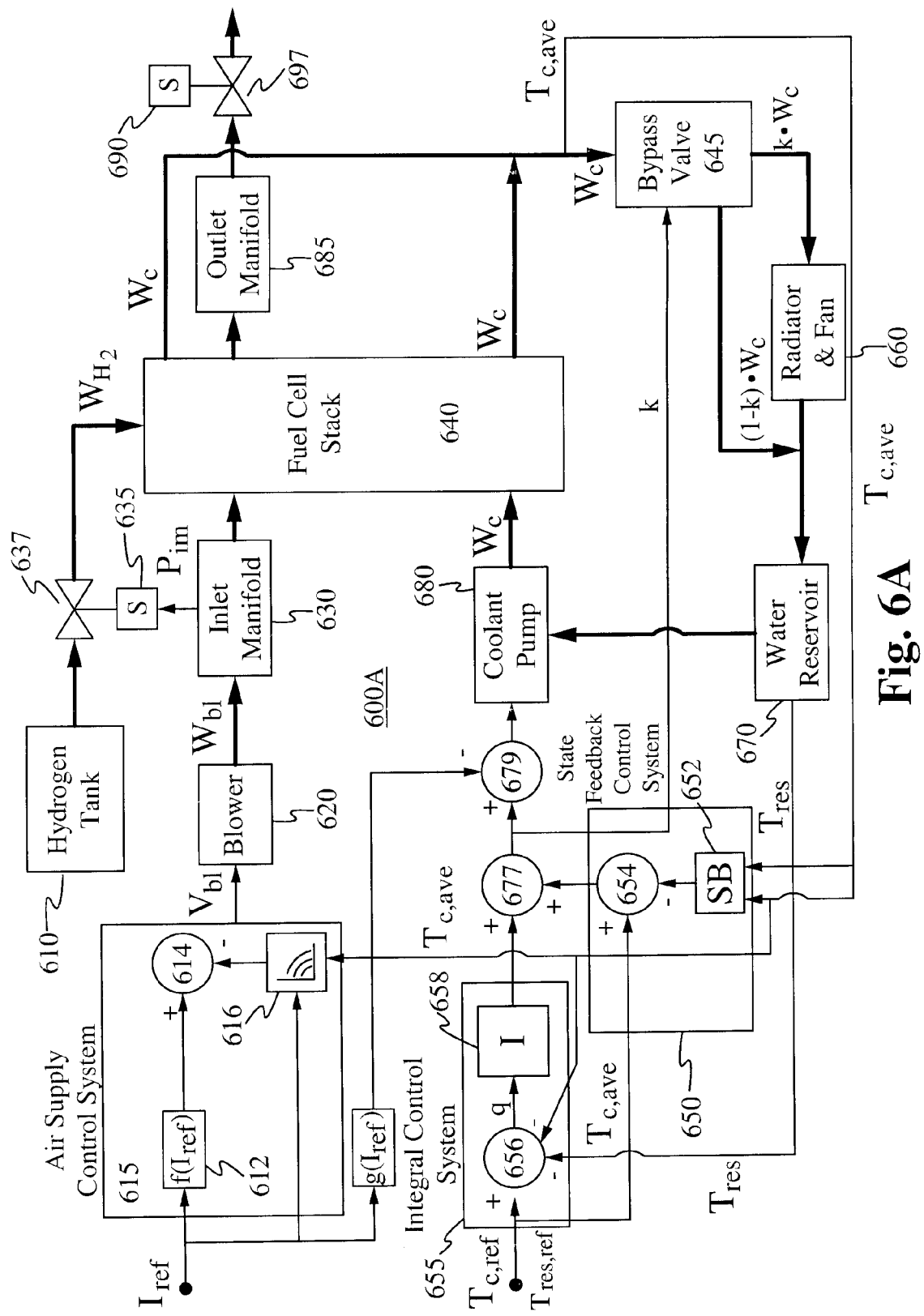
FIG. 6A illustrates yet another embodiment of an air and coolant control system using state feedback and integral controllers and a bypass valve in accordance with the principles of the present invention.

FIG. 6A illustrates yet another embodiment of an air and coolant control system 600A using state feedback and integral controllers and a bypass valve in accordance with the principles of the present invention. In some embodiments, system 600A comprises a hydrogen tank 610, air supply source 620, air supply control system 615, controller 612, logic component 614, comparator 616, coolant pump 680, coolant reservoir 670, radiator and fan 660, bypass valve 645, fuel cell stack 640, inlet manifold 630, outlet manifold 685, stators 635 and 690, and valves 637 and 697, similar to the configuration of the corresponding components presented in FIG. 5A, with similar connections and functionality. However, system 600A replaces coolant flow control system 550 and bypass valve control system 565 with integral control system 655 and state feedback control system 650.

Integral control system 655 uses logic component 656 to process a reference coolant temperature $T_{c,ref}$, a reference reservoir temperature $T_{res,ref}$, an actual reservoir temperature $T_{res}$, and the actual average temperature $T_{c,ave}$ of the coolant from the fuel cell stack 640. The result q is transmitted to an integral controller 658.

The state feedback control system 650 uses a state feedback controller 652 to process the actual reservoir temperature $T_{res}$ and the actual average temperature $T_{c,ave}$ of the coolant from the fuel cell stack 640. The result is transmitted to logic component 654, which processes this result with reference temperatures $T_{c,ref}$ and $T_{res,ref}$, then transmits the result to logic component 677. Logic component 677 processes this result along with the result from integral controller 658 to determine the proportion k of coolant from the fuel cell stack 640 that should be passed through the radiator and fan 660. A control signal is then transmitted to the bypass valve 645 indicating this proportion.

The result of logic component 677 is also transmitted to logic component 679, where it is processed along with the estimated feed-forward heat source characteristic from controller 675 in order to determine the appropriate coolant flow rate. Upon the appropriate flow rate being determined, a signal is transmitted to the coolant pump 680 to regulate it accordingly.

Figure 6B:
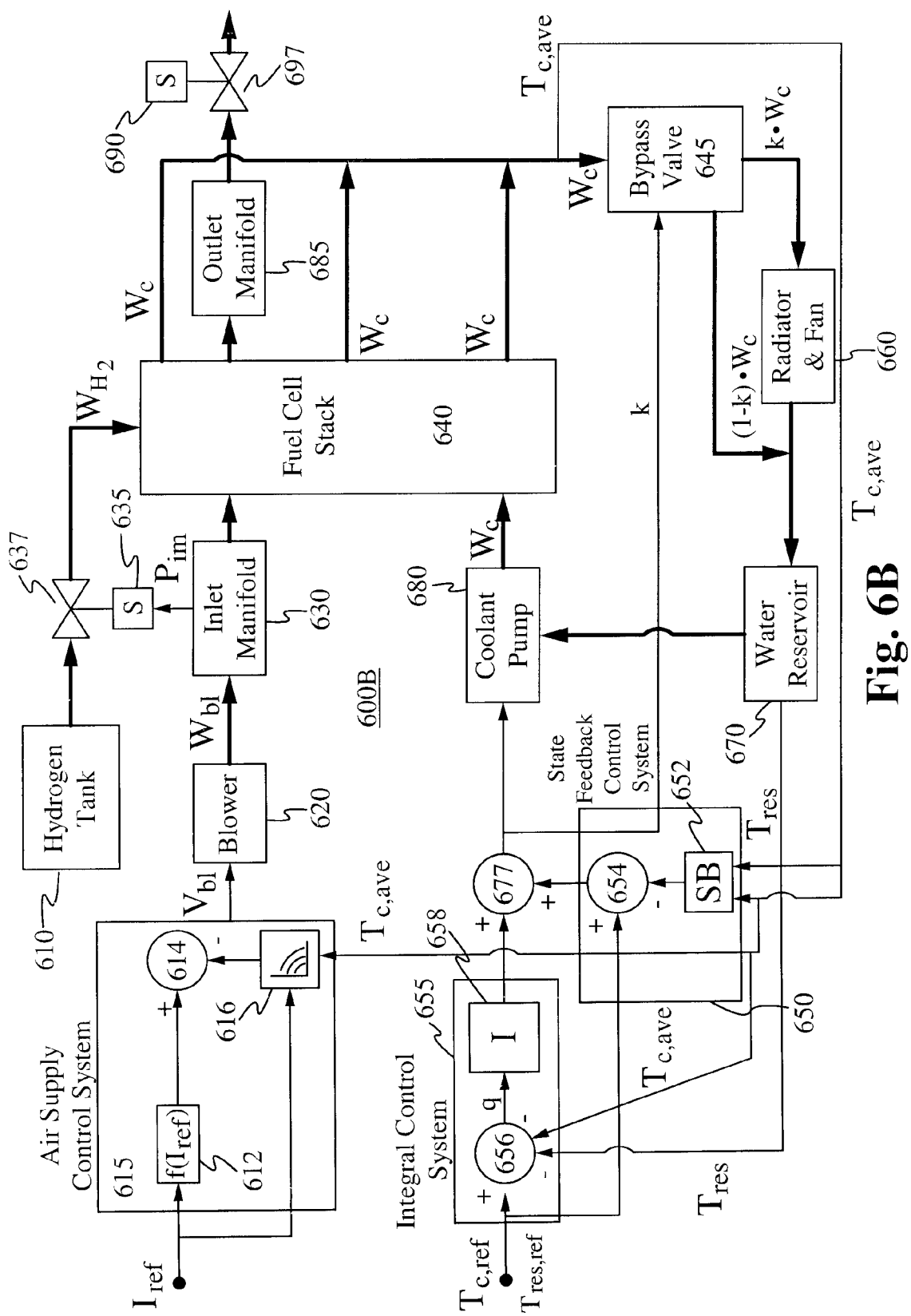
FIG. 6B illustrates yet another embodiment of an air and coolant control system using state feedback and integral controllers and a bypass valve in accordance with the principles of the present invention.

FIG. 6B illustrates yet another embodiment of an air and coolant control system 600B, which is a variation of system 600A in FIG. 6A. System 600B has the same components and functionality as FIG. 6A, except that a feed-forward heat source characteristic is not incorporated into the control of the coolant flow rate. Rather, it uses the dynamic feedback temperature characteristic to determine the appropriate coolant flow rate without applying an estimated load profile.

It is contemplated that the estimated feed-forward heat source characteristic and the dynamic feedback temperature characteristic are able to be employed in any combination in order to optimize air flow rate, coolant flow rate and/or coolant temperature.

Simulations are performed to analyze the dynamic behavior of the stack along with the air supply, thermal system and the associated control strategies. Dynamics of water content in the membranes, temperature variations, oxygen excess ratio and responses at the load currents are analyzed below. The parameters and reference data for the models chosen are illustrated in the table in FIG. 7, which are partially empirical. All models were coded by blocks given in MATLAB/Simulink.

Figure 8:
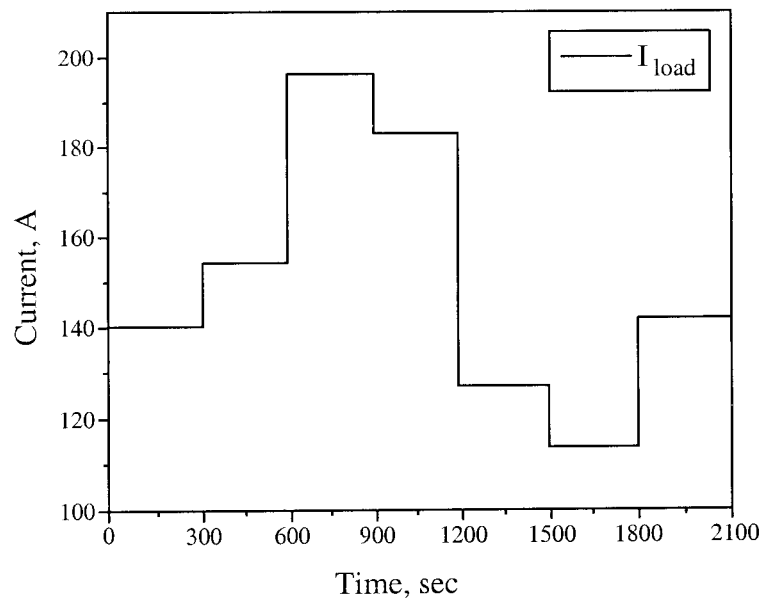
FIG. 8 is a graph illustrating a step load current.
Figure 9:
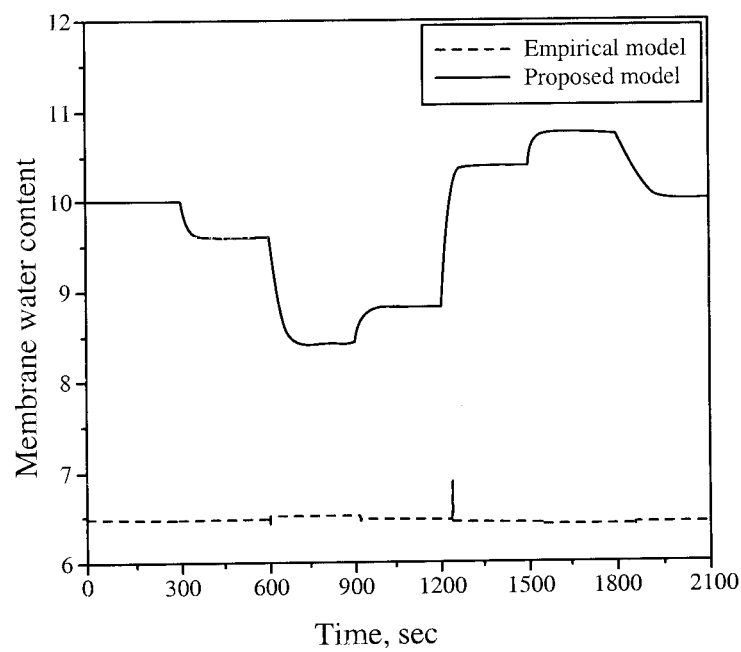
FIG. 9 is a graph illustrating a comparison of the membrane water content between the empirical model and the proposed model.

FIG. 9 shows a comparison of the membrane water content between the empirical model and the proposed model at a step load current illustrated in FIG. 8. Primarily, the membrane water content depends on the relative humidity determined by the standard vapor pressure, which is dependent on the temperature and vapor pressures of the cathode and anode side. Since the empirical model assumed a constant temperature of 80° C. in the membrane, no dynamics of water transfer are involved and subsequently the vapor pressure only follows the change of the load current. Conversely, the water balance in the membrane and the temperature strongly influence the water content in the membrane. The water content gets higher when the temperature of the catalyst layer on the cathode side is controlled at 80° C., and the temperature of the gas channel falls lower than 80° C. Then, the saturated vapor pressure decreases and relative humidity becomes higher. It is observed that the elevated temperature of the stack by a high load current leads to a high saturated vapor pressure and a low relative humidity on both sides of the cell. As a result, the membrane water content is decreased.

Figure 10:
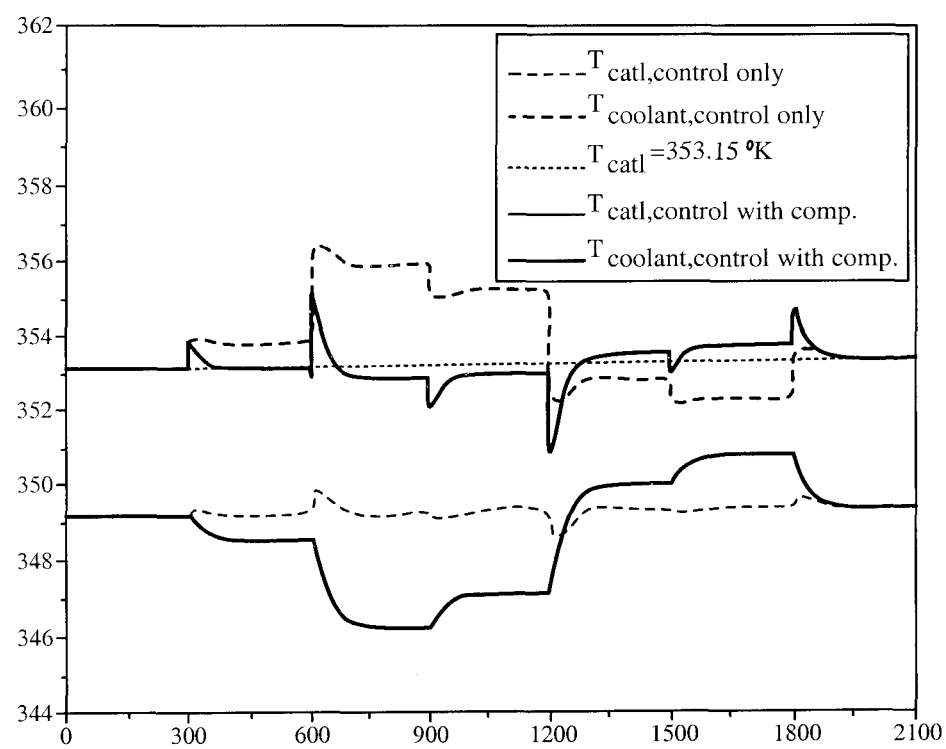
FIG. 10 is a graph illustrating the temperatures of the catalyst layer and the coolant channel by the coolant flow controls with and without the feed-forward of the disturbance.

FIG. 10 shows the temperature in the catalyst and coolant channel with and without the feed-forward of the disturbance. Due to the inaccessibility of the temperature in the catalyst layer during operations, the actual temperature is usually measured at the stack outlet coolants on the anode and cathode sides, and then averaged. Considering the maximum limit of the temperature in the catalyst and membrane, a reference temperature for the coolant control is set to be 76° C.

When a multi-step current is applied to the stack, the temperature in the stack rapidly rises, particularly in the catalyst on the cathode side. The temperature rise is 3~7° C. higher than the average temperature in the stack, where the coolant temperature is fully controlled for the reference temperature 76° C. (see the dotted lines $T_{catl,control\ only}$ and $T_{coolant,control\ only}$ in FIG. 10). It should be noted that the catalyst and membrane layers could be overheated and damaged.

The difference in temperature in the layers can be reduced by a feed-forward (FF) of the disturbance to the coolant control loop that should reject this excessive heat as quickly as possible. The transfer function of the disturbance is $$q = \left[ \begin{array}{c} T_{st}^* - T_{st} \\ T_{res}^* - T_{res} \end{array} \right].$$

The result of the control strategy proposed is illustrated in FIG. 10 with a straight line, where the temperature of the catalyst layer is nearly maintained at 80° C. The coolant temperature keeps track of the variation in the catalyst temperature. However, an instant rise in temperature cannot be fully suppressed because of the high thermal mass and large heat capacity of the stack. In addition, there remains a steady state error caused by the temperature difference between the coolant channel measured and the catalyst layer. Nevertheless, the cooling of the cell is effective and the duration of the heat on individual layers can be minimized.

Figure 11:
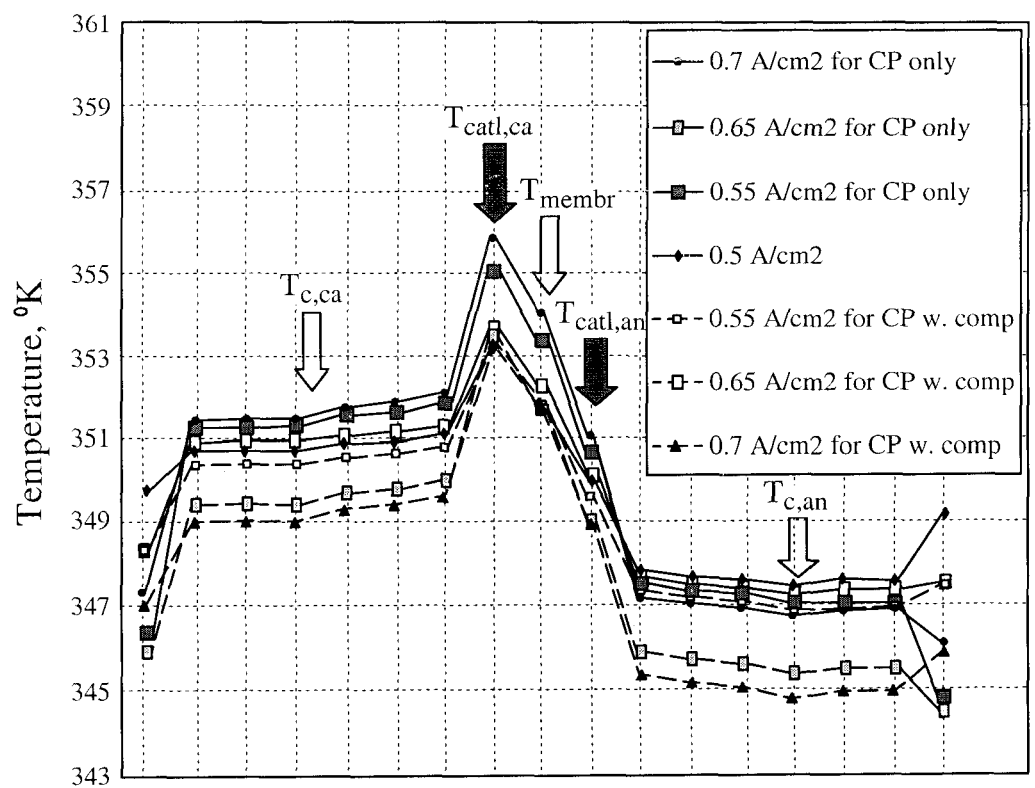
FIG. 11 is a graph illustrating the effects of the coolant controls on temperature variation in a cell depending on currents with and without the feed-forward of the disturbance.

FIG. 11 shows the effects of the coolant controls on temperature distributions through the plane of a cell. As the amplitude of the current changes stepwise from 0.5 A to 0.55 A, 0.65 A and 0.7 A, the stack temperature accordingly becomes higher. When the feed-forward is applied, the overall stack temperature is lowered and the catalyst temperature is kept at 353.5° K, which is significantly lower than before. Likewise, the maximum difference of the temperature between the catalyst on the cathode side and the coolant channel becomes 4° K lower than before. As a result, the cooling of the stack becomes more effective than before.

Figure 12:
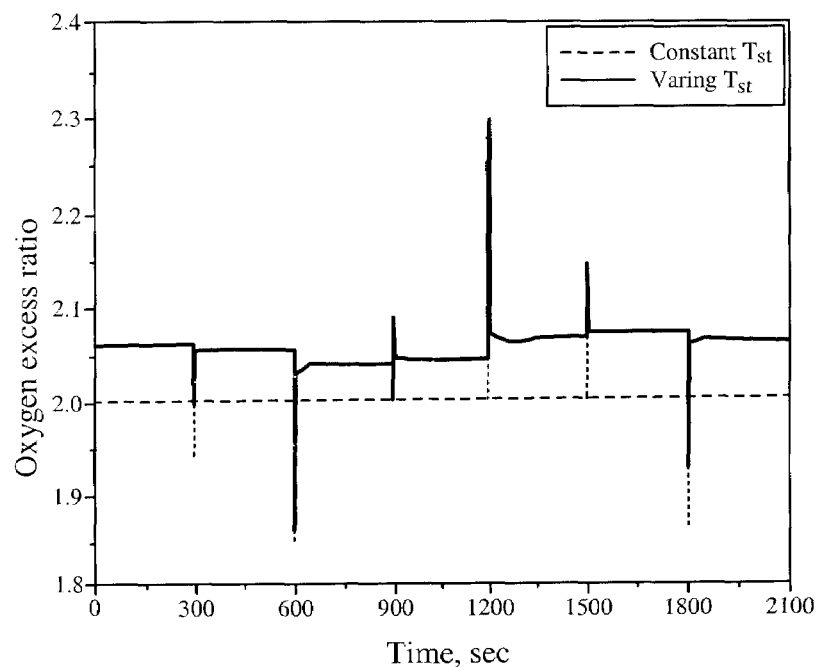
FIG. 12 is a graph illustrating a comparison of the oxygen excess ratio at a constant and dynamically varying temperature.

FIG. 12 illustrates the oxygen excess ratio at a constant and dynamically varying temperature with a coolant flow control. Due to the change of pressure in the gas flow channel caused by variations in the stack temperature, the oxygen excess ratio is inversely influenced by the direction of the current changes.

Figure 13:
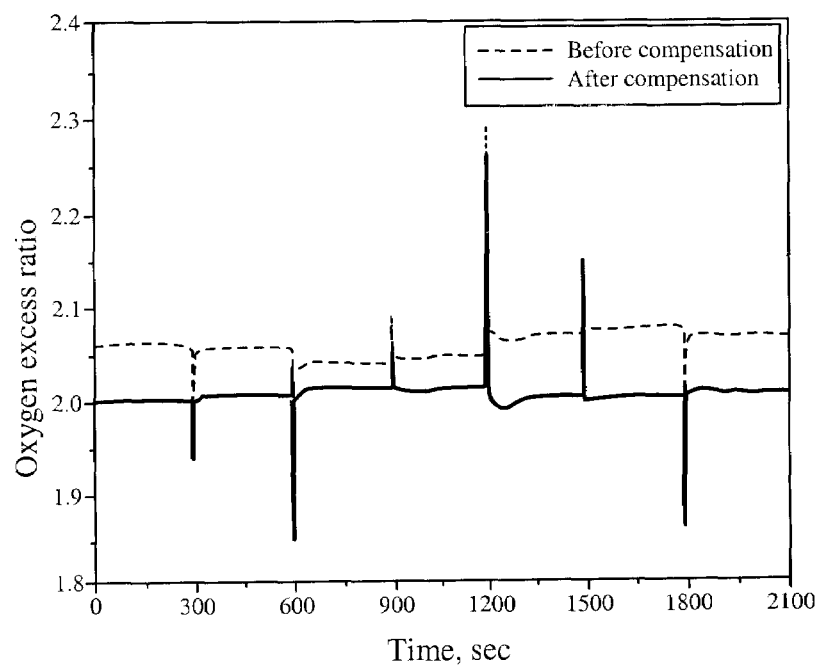
FIG. 13 is a graph illustrating a comparison of the oxygen excess ratio before and after a compensation of the temperature influence on the air control loop.

FIG. 13 shows a comparison of the oxygen excess ratio before and after a compensation of the temperature influence on the air control loop. The compensation enables the oxygen excess ratio to be maintained at level 2, even though the current applied to the stack varies stepwise, which implies that the parasitic power at the blower gets less.

Figure 14:
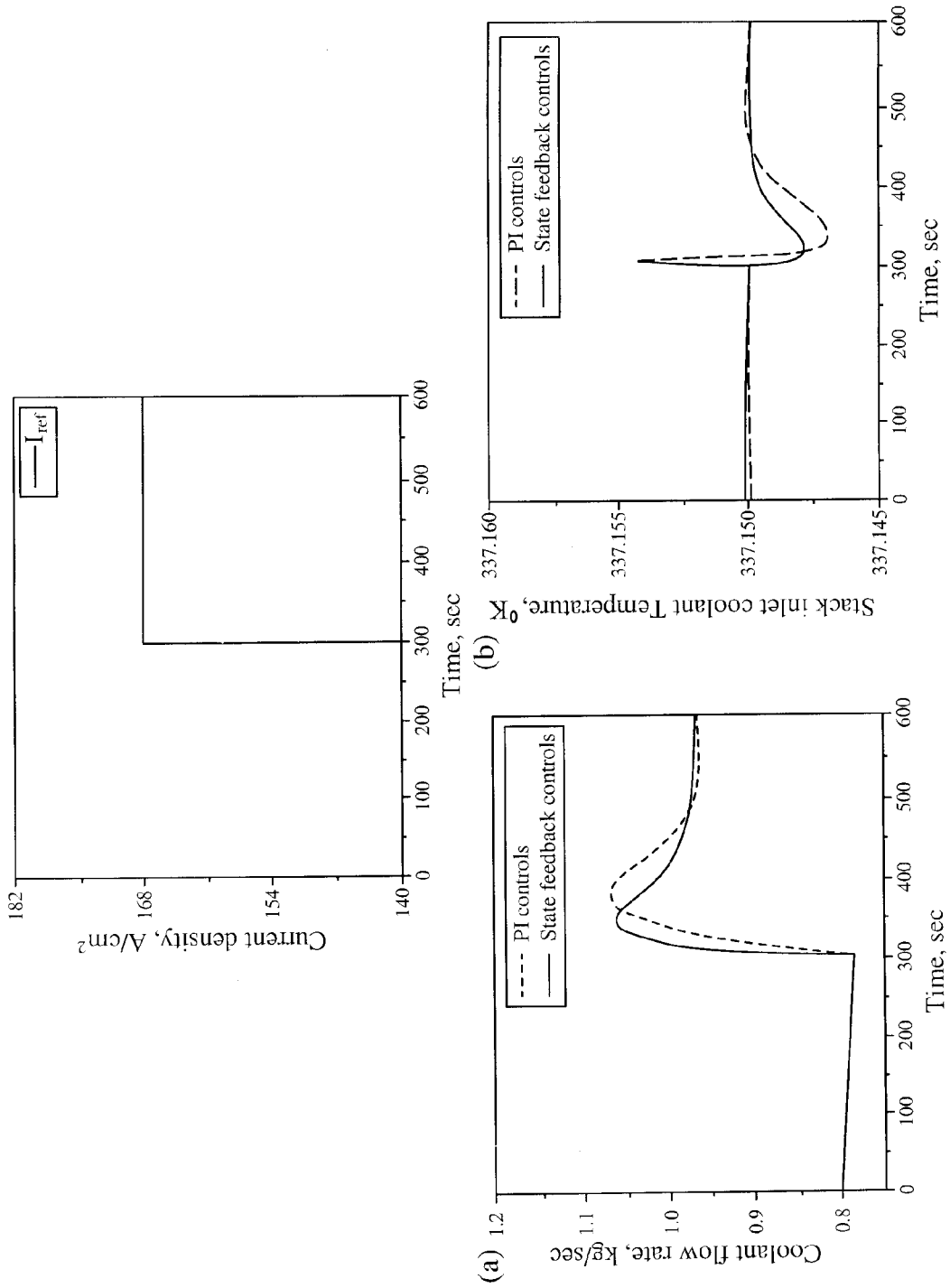
FIG. 14 illustrates a comparison of the coolant flow rate and the stack inlet coolant temperature with a given current step between PI controls and state feedback controls.
Figure 15A:
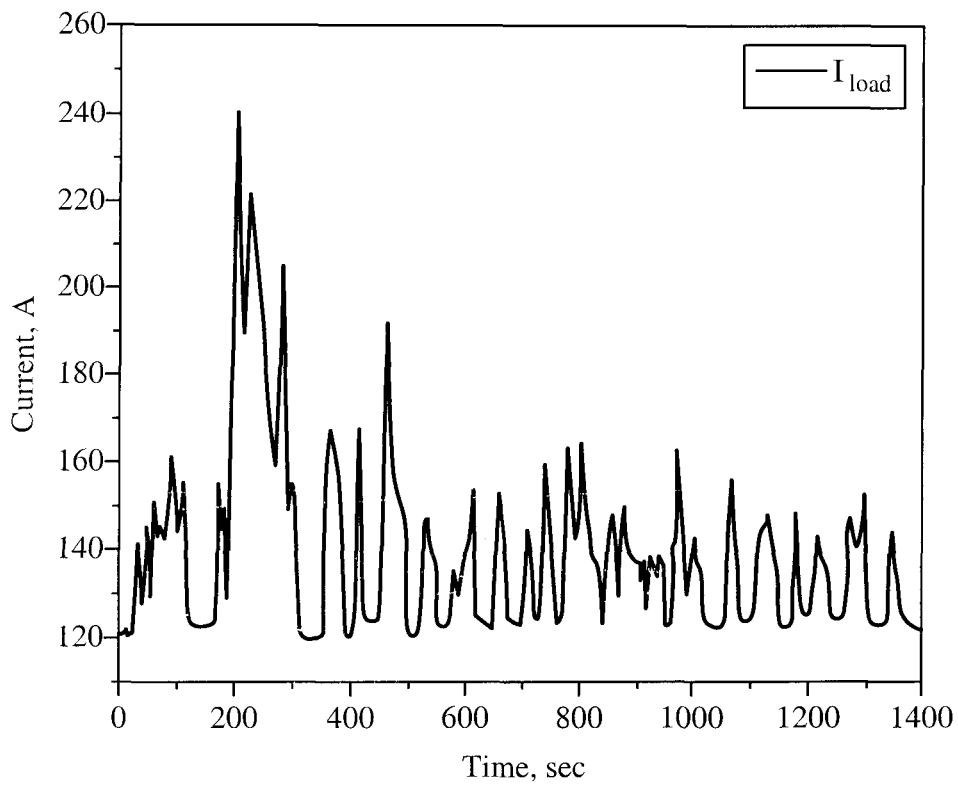
FIG. 15($a$) is a graph illustrating a current profile.
Figure 15C:
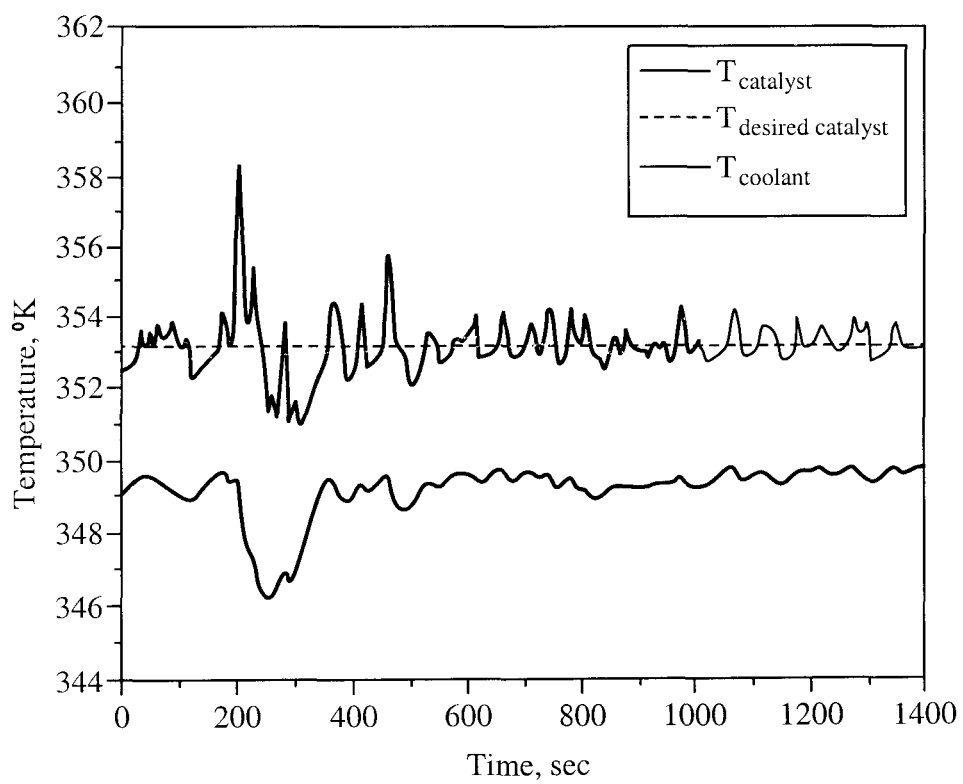
Figure 15B:
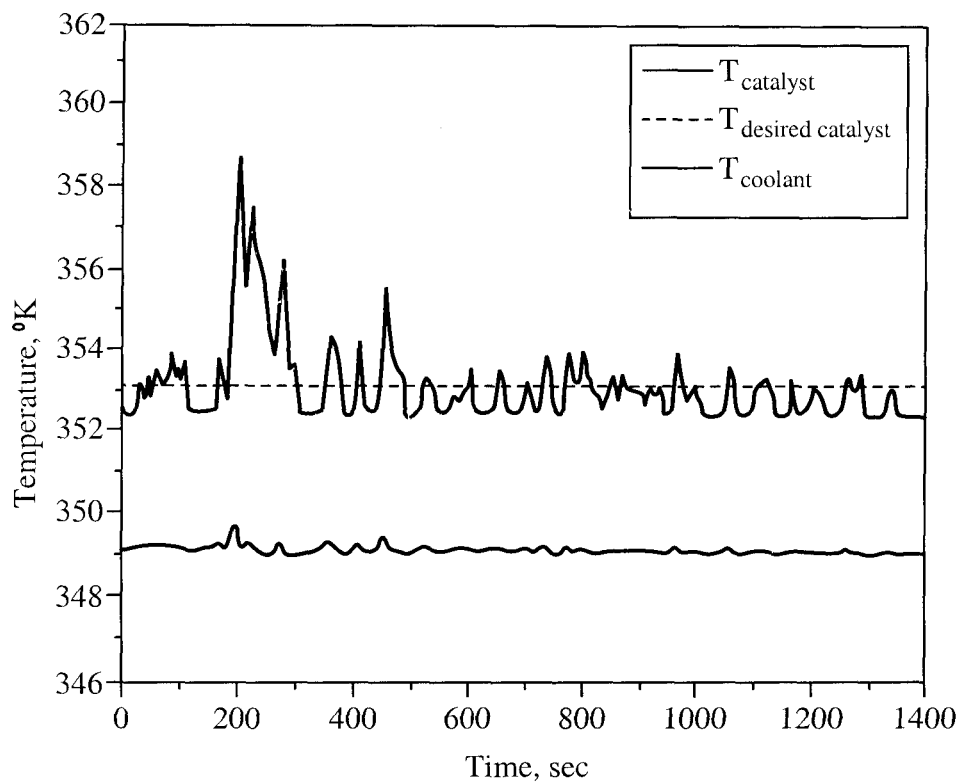
Figure 15D:
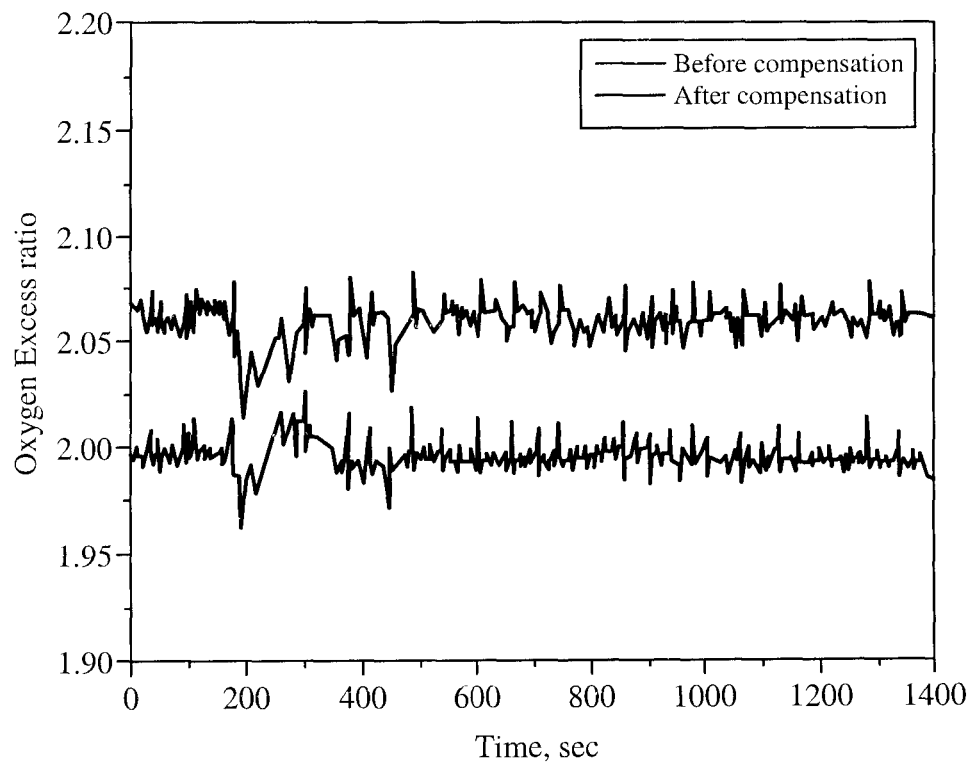

Comparison between both the PI controls and the state feedback controls shows that the parasitic power of the state feedback controls a multi-step current load is 5% less than the one by the PI controls. However, the dynamic response if much improved by the state feedback controls. In FIG. 14, step responses of two controls are simulated with the models aforementioned. The output states are the coolant flow rate and the stack inlet coolant temperature. The rise time of the coolant flow rate by the state feedback controller is 6 seconds, is 4 times faster than the one by PI controls. Likewise, the rise time of the stack inlet coolant temperature is 3 times faster than the one of the PI controller.

Parasitic power is calculated by summing up the electrical power necessary for driving the blower and the coolant pump. The control strategies with the state feedback control proposed require 100 kWs at the multiple step current, while the one without the considering valve and PI control loop for the coolant need 106 kWs.

Furthermore, the response of the state feedback control is compared with a conventional one by using a current profile obtained from a vehicle tested at the Federal Urban Driving System (FUDS). FIG. 15 shows the simulation results for the two different control strategies at the current. The peak temperature in the catalyst layer is 6° K higher than the working stack temperature by the control without the FF, even though the coolants are fairly controlled around the set reference temperature shown in FIG. 9b. FIG. 9c shows the temperature of the catalyst and coolants with the FF of the disturbance. The peak of the temperature is similar to the others for the first 200 seconds, but is substantially suppressed in the following intervals compared to FIG. 9b. The excursion duration of the catalyst temperature lessens, and the heat energy imposed on the thin layers can finally be reduced, which significantly reduces the heat stress on the layers. Correspondingly, the oxygen excess ratio is fairly maintained at the optimum value by the compensation shown in FIG. 9d.

The present invention addresses the design of temperature control strategies and its effect on dynamics and performance. The controllability is assessed by using a dynamic stack model that includes gas diffusion in GDL, dynamic water balance in the membrane and temperature variation, and components of air supply and thermal system.

Improvement of dynamic stack behavior is accomplished by adding dynamic water balance in the membrane and through a partial pressure drop in the GDL and temperature distributions. The results show that distribution of the temperature through the plane is asymmetric and the temperature rise amounts to 3-7° C., potentially damaging the layers at a high current load. Therefore, proper control of the air and temperature might be required to secure durability and increase efficiency.

Most strategies have focused on optimization of the air supply system, where the working temperature in the fuel cell stack is presumed to be constant. However, it turns out that the oxygen excess ratio inversely varies as the temperature changes. Thus, the ideal oxygen excess ratio necessary for prevention of an oxygen starvation cannot be maintained at the optimum value of 2.

The control strategies of the present invention include a state feedback control with a feed-forward of the disturbance and a compensator for minimization of the temperature effect on the air flow rate. For the design of the temperature controller, the thermal circuit is approximated with a second order system. Classic PI and state feedback controls are used to compare the effectiveness of the cooling. The results show that the temperature rise in the catalyst can be kept within an allowable value and duration. In addition, the oxygen excess ratio can be maintained with an optimal value by minimizing the influence of temperature variations in the gas flow channel. Consequently, the power consumption of the blower can be reduced by more than 15% by compensation, and 5% by the controlling bypass valve at a multi-step load profile. Final reduction of the total parasitic power has been accomplished by approximately 7%.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. An air and coolant control system comprising:
    a heat source comprising an air inlet, a coolant inlet, and a coolant outlet fluidly coupled to the coolant inlet through the heat source, wherein the heat source receives air through the air inlet, to generate heat in response to receiving the air, to receive coolant through the coolant inlet, to conduct the received coolant to the coolant outlet, and to transfer a portion of the generated heat to the received coolant, thereby removing the portion of the generated heat from the heat source as the coolant is conducted out of the heat source through the coolant outlet;
    an air supply source fluidly coupled to the air inlet of the heat source to supply the air to the heat source;
    an air supply control system programmed to adjust the flow rate of air from the air supply source to the heat source based on a dynamic feedback temperature characteristic from the heat source;

a coolant supply source fluidly coupled to the coolant inlet of the heat source to supply the coolant to the heat source; and a coolant control system programmed to adjust the flow rate of the coolant supplied to the heat source based on an estimated feed-forward heat source characteristic and to adjust the temperature of the coolant supplied to the heat source based on the dynamic feedback temperature characteristic.

2. The system of claim 1, wherein the heat source is a fuel cell stack.

3. The system of claim 2, wherein the fuel cell stack is a Polymer Electrolyte Membrane (PEM) fuel cell stack.

4. The system of claim 2, further comprising a hydrogen tank fluidly coupled to the fuel cell stack to supply hydrogen to the fuel cell stack.

5. The system of claim 1, wherein the dynamic feedback temperature characteristic comprises information indicating a temperature of the coolant measured at the coolant outlet of the heat source.

6. The system of claim 1, wherein the estimated feed-forward heat source characteristic comprises an estimation of excess heat in the heat source at a load profile.

7. The system of claim 6, further comprising a feed-forward controller programmed to adjust the flow rate of the coolant based on the load profile and interpolated map data.

8. The system of claim 1, wherein the coolant control system comprises at least one controller from the group of controllers consisting of: a proportional-integral controller and a state feedback controller.

9. The system of claim 1, further comprising:
a coolant reservoir to store coolant that is to be conducted to and through the heat source;
a coolant pump to pump the coolant from the coolant reservoir to the heat source, the flow rate of the coolant being controlled by the coolant flow control system;
a cooling system to cool coolant from the heat stack and provide the cooled coolant to the coolant reservoir; and
a bypass valve to regulate the amount of coolant supplied from the heat source to the cooling system for cooling, wherein the regulation is based on dynamic temperature information about the heat source.

10. An air and coolant control system comprising:
a heat source comprising an air inlet, a coolant inlet, and a coolant outlet fluidly coupled to the coolant inlet through the heat source, wherein the heat source receives air through the air inlet, to generate heat in response to receiving the air, to receive coolant through the coolant inlet, to conduct the received coolant to the coolant outlet, and to transfer a portion of the generated heat to the received coolant, thereby removing the portion of the generated heat from the heat source as the coolant is conducted out of the heat source through the coolant outlet;
an air supply source fluidly coupled to the air inlet of the heat source to supply the air to the heat source;
an air supply control system programmed to adjust the flow rate of air from the air supply source to the heat source based on a dynamic feedback temperature characteristic from the heat source; and
a coolant supply source fluidly coupled to the coolant inlet of the heat source to supply the coolant to the heat source.

11. The system of claim 10, further comprising a coolant control system programmed to adjust the flow rate of the coolant supplied to the heat source based on an estimated feed-forward heat source characteristic.

12. The system of claim 11, wherein the estimated feed-forward heat source characteristic comprises an estimation of excess heat in the heat source at a load profile.

13. The system of claim 12, further comprising a feed-forward controller programmed to adjust the flow rate of the coolant based on the load profile and interpolated map data.

14. The system of claim 10, wherein the dynamic feedback temperature characteristic comprises information indicating a temperature of the coolant measured at the coolant outlet of the heat source.

15. The system of claim 10, further comprising a coolant control system programmed to adjust the temperature of the coolant supplied to the heat source based on the dynamic feedback temperature characteristic.

16. The system of claim 10, wherein the heat source is a fuel cell stack.

17. The system of claim 16, wherein the fuel cell stack is a Polymer Electrolyte Membrane (PEM) fuel cell stack.

18. The system of claim 16, further comprising a hydrogen tank fluidly coupled to the fuel cell stack to supply hydrogen to the fuel cell stack.

19. The system of claim 10, further comprising:
a coolant reservoir to store coolant that is to be conducted to and through the heat source;
a coolant pump to pump the coolant from the coolant reservoir to the heat source, the flow rate of the coolant being controlled by the coolant flow control system;
a cooling system to cool coolant from the heat stack and provide the cooled coolant to the coolant reservoir; and
a bypass valve to regulate the amount of coolant supplied from the heat source to the cooling system for cooling, wherein the regulation is based on dynamic temperature information about the heat source.

20. An air and coolant control system comprising:
a heat source comprising an air inlet, a coolant inlet, and a coolant outlet fluidly coupled to the coolant inlet through the heat source, wherein the heat source receives air through the air inlet, to generate heat in response to receiving the air, to receive coolant through the coolant inlet, to conduct the received coolant to the coolant outlet, and to transfer a portion of the generated heat to the received coolant, thereby removing the portion of the generated heat from the heat source as the coolant is conducted out of the heat source through the coolant outlet;
an air supply source fluidly coupled to the air inlet of the heat source to supply the air to the heat source;
a coolant supply source fluidly coupled to the coolant inlet of the heat source to supply the coolant to the heat source; and
a coolant control system programmed to adjust the flow rate of the coolant supplied to the heat source based on an estimated feed-forward heat source.

21. The system of claim 20, wherein the estimated feed-forward heat source characteristic comprises an estimation of excess heat in the heat source at a load profile.

22. The system of claim 21, further comprising a feed-forward controller programmed to adjust the flow rate of the coolant based on the load profile and interpolated map data.

23. The system of claim 20, wherein the coolant control system is further programmed to adjust the temperature of the coolant supplied to the heat source based on a dynamic feedback temperature characteristic of the heat source.

24. The system of claim 20, wherein the heat source is a fuel cell stack.

25. The system of claim 24, wherein the fuel cell stack is a Polymer Electrolyte Membrane (PEM) fuel cell stack.

26. The system of claim 24, further comprising a hydrogen tank fluidly coupled to the fuel cell stack to supply hydrogen to the fuel cell stack.

27. The system of claim 20, further comprising:
a coolant reservoir to store coolant that is to be conducted to and through the heat source;
a coolant pump to pump the coolant from the coolant reservoir to the heat source, the flow rate of the coolant being controlled by the coolant flow control system;
a cooling system to cool coolant from the heat stack and provide the cooled coolant to the coolant reservoir; and
a bypass valve to regulate the amount of coolant supplied from the heat source to the cooling system for cooling, wherein the regulation is based on dynamic temperature information about the heat source.

28. An air and coolant control system comprising:
a heat source comprising an air inlet, a coolant inlet, and a coolant outlet fluidly coupled to the coolant inlet through the heat source, wherein the heat source receives air through the air inlet, to generate heat in response to receiving the air, to receive coolant through the coolant inlet, to conduct the received coolant to the coolant outlet, and to transfer a portion of the generated heat to the received coolant, thereby removing the portion of the generated heat from the heat source as the coolant is conducted out of the heat source through the coolant outlet;
an air supply source fluidly coupled to the air inlet of the heat source to supply the air to the heat source;
an air supply control system programmed to adjust the flow rate of air from the air supply source to the heat source based on a dynamic feedback temperature characteristic from the heat source;
a coolant supply source fluidly coupled to the coolant inlet of the heat source to supply the coolant to the heat source; and
a coolant control system programmed to adjust the temperature of the coolant supplied to the heat source based on the dynamic feedback temperature characteristic, wherein the dynamic feedback temperature characteristic comprises information indicating a temperature of the coolant measured at a coolant reservoir to store coolant that is to be conducted to and through the heat source.

29. The system of claim 28, wherein the dynamic feedback temperature characteristic comprises information indicating a temperature of the coolant measured at the coolant outlet of the heat source.

30. The system of claim 28, wherein the heat source is a fuel cell stack.

31. The system of claim 30, wherein the fuel cell stack is a Polymer Electrolyte Membrane (PEM) fuel cell stack.

32. The system of claim 30, further comprising a hydrogen tank fluidly coupled to the fuel cell stack to supply hydrogen to the fuel cell stack.

33. The system of claim 28, further comprising:
a coolant pump to pump the coolant from the coolant reservoir to the heat source, the flow rate of the coolant being controlled by the coolant flow control system;
a cooling system to cool coolant from the heat stack and provide the cooled coolant to the coolant reservoir; and
a bypass valve to regulate the amount of coolant supplied from the heat source to the cooling system for cooling, wherein the regulation is based on dynamic temperature information about the heat source.

* * * * *